United States Patent [19]
Hasegawa et al.

[11] Patent Number: 5,379,353
[45] Date of Patent: Jan. 3, 1995

[54] APPARATUS AND METHOD FOR CONTROLLING A MOVING VEHICLE UTILIZING A DIGITAL DIFFERENTIAL ANALYSIS CIRCUIT

[75] Inventors: Hiroshi Hasegawa; Okada Yshushi, both of Saitama, Japan

[73] Assignee: Honda Giken Kogyo Kabushiki Kaisha, Tokyo, Japan

[21] Appl. No.: 125,350

[22] Filed: Sep. 22, 1993

Related U.S. Application Data

[63] Continuation of Ser. No. 898,188, Jun. 12, 1992, abandoned, which is a continuation of Ser. No. 349,536, May 9, 1989, abandoned.

[30] Foreign Application Priority Data

| | | | |
|---|---|---|---|
| May 9, 1988 | [JP] | Japan | 63-112241 |
| May 9, 1988 | [JP] | Japan | 63-112242 |
| May 9, 1988 | [JP] | Japan | 63-112243 |

[51] Int. Cl.$^6$ .................. G06K 9/20; G06K 9/36
[52] U.S. Cl. ............................ 382/41; 382/48
[58] Field of Search ............ 382/28, 41, 43, 48; 364/461, 424.02, 424.07; 358/103; G06K 9/46, 9/36, 9/20; H04N 7/00; G06F 7/70, 15/20

[56] References Cited

U.S. PATENT DOCUMENTS

| | | | |
|---|---|---|---|
| 3,069,654 | 1/1963 | Hough | 382/48 |
| 4,618,989 | 10/1986 | Tsukune et al. | 382/41 |
| 4,731,860 | 3/1988 | Wahl | 382/41 |
| 4,776,027 | 10/1988 | Hisano et al. | 382/48 |
| 4,855,822 | 8/1989 | Narendra et al. | 358/103 |
| 4,868,752 | 9/1989 | Fuji et al. | 382/41 |
| 4,970,653 | 11/1990 | Kenue | 358/103 |

FOREIGN PATENT DOCUMENTS 0221643  5/1987  European Pat. Off. ...... G05D 1/03

OTHER PUBLICATIONS

Mori, H. "Environment Understanding of Mobile Robot Harunobu-3 by Picture Interpretation Language PIL5 V3" IEEE 1986, pp. 158-161.

LeMoigne, J. "Knowledge-base reasoning for road following" IEEE 1986, pp. 244-247.

Smart Highways, Popular Science, Nov. 1989, 119.

Courtney et al. Robot Guidance Using Computer Vision, 1984 585-592.

Primary Examiner—Jose L. Couso
Attorney, Agent, or Firm—Lyon & Lyon

[57] ABSTRACT

This invention relates to a picture processing device in which picture data of a road or lines marking off a lane taken by a television camera installed on a vehicle is processed for the recognition of the contour of the road or the lane. Picture data is analog/digital converted, then edited and is subjected to the binary processing to be supplied to a digital differential analysis computing circuit. The digital differential analysis circuit comprises circuits serially connected each of which computes a rotary motion recurrence formula every rotation by a rotation angle. The recurrence formula is computed in the pipe-line system. In this computation the Hough transform is performed to give sine curves in a $\rho\text{-}\theta$ coordinate system. The points of intersection of these sine curves (Hough curves) are given, and those of them having more occurrences are selected in the $\rho\text{-}\theta$ coordinate system. Resultantly, the contour of the shoulder lines and the center line of the road, or the contour of the lane are given.

12 Claims, 31 Drawing Sheets

| SEQUENCE OF DATA | I | II | III | IV | V | VI | VII | IIX | IX | X |
|---|---|---|---|---|---|---|---|---|---|---|
| DATA VALUE | 5 | 7 | 2 | 8 | 4 | 9 | 3 | 1 | 6 | 8 |

APPARATUS AND METHOD FOR CONTROLLING A MOVING VEHICLE UTILIZING A DIGITAL DIFFERENTIAL ANALYSIS CIRCUIT

This is a continuation of co-pending application Ser. No. 07/898,188, filed on Jun. 12, 1992, and which designated the U.S., now abandoned, which is an continuation of application Ser. No. 07/349,536, filed on May 9, 1989, now abandoned.

BACKGROUND OF THE INVENTION

1. Technical Field of the Invention

This invention relates to a picture processing device which is used in control ling unmanned running vehicles or recognizing motions of objects to be observed in real time.

2. Related Background Art

In controlling an unmanned movable robot Or an automatic movable vehicle, for example, the pictures of the lines marking of f a lane, and those of the center line and the shoulder lines of a road have to be taken by a camera to be subjected to picture processing. FIG. 1 is a view explaining recognition of a road by means of a picture. FIG. 1(a) shows a picture of a road taken by a camera. FIG. 1(b) is a view in which the picture elements in FIG. 1 (a) having higher brightness (or higher brightness change ratios ) are shown in black points.

As shown in FIG. 1(a), in a camera picture 1 a road 3 is extended at infinity toward a horizontal line 2. Shoulder lines 4 are on both sides of the road 3. A center line 5 is at the center or the road 5. The shoulder lines 4 and the center line 5 of the road 3 have higher brightnesses than the other parts of the road 3 and are shown in continuous dots 4', 5' as shown in FIG. 1(b). Based on this camera picture 1, in order to recognize the direction and curves of the road 3, approximate straight lines $L_1$, $L_2$, $L_3$ interconnecting the dots 4'in FIG. 1(b) are recognized.

As a method for giving the approximate straight lines L, the method called Hough transformation is conventionally known (e.g., Specification of U.S. Pat. No. 3,069,654). This method is explained with reference to FIGS. 24. Assuming that a point P $(x_p, y_p)$ to be processed is present on an original picture depicted by the x y coordinate system as shown in FIG. 2(a), an infinite number of straight lines 1 ($i_a$, $i_b$ ... ) can be depicted. Straight lines passing the origin 0 (0,0) and orthogonal to the respective straight lines $1_a$, $1_b$, ... can be also depicted. When a length of the straight lines 1 passing the origin 0 (0,0) to the straight lines 1 ($1_a$, $1_b$, ...) is represented by $\rho$, and an angle these straight lines form to the x axis is represented by $\theta$ ($\theta_a$, $\theta_b$, ...), the $\rho$ and $\theta$ of the straight lines passing the origin 0 (0,0) are given in the sine curve of FIG. 2(b), i.e., the Hough curve. The length $\rho_{max}$ between the origin O (O,O) and the point to be processed P $(x_p,y_p)$ is the longest of the straight lines passing the point to be processed P $(x_p,y_p)$. The length is given by $$\rho_{max}=(x_p^2+y_p^2)^{\frac{1}{2}}$$

and when $\theta=0$, $\rho_0=x_p$.

Next, as shown in FIG. 3(a), Hough transform of FIG. 2 will be applied to Three points $P_1 \sim P_3$ a straight line L. The sine curve (Hough curve) in the dot line in FIG. 3(b) is given with respect To the point $P_1$. The sine curve with respect to the point $P_2$ is in the one dot line in FIG. 3(b), and that with respect to the point $P_3$ is in the two dot line in FIG. 3(b). The peaks $(\rho_1,\theta_1)$, $(\rho_2,\theta_2)$ and $(\rho_3,\theta_3)$ of the respective sine curves of FIG. 3(b) correspond to the lengths $\rho_1$, $\rho_1$, $\rho_3$ between the origin 0 (0,0) and the respective points $P_1$, $P_2$ and $P_3$ in FIG. 3(a), and the angles $\theta_1$, $\theta_2$, $\theta_3$ the respective straight lines passing the origin 0 form to the x axis.

In FIG. 3(b), the point of intersection of the three Hough curves (sine curves) has coordinates $(\theta_t,\theta_t)$ which are equal to $\rho_t,\theta_t$ of a straight line passing the origin 0 (0,0) and orthogonal to the straight line L. Thus yb obtaining a point of intersection of such sine curves, an approximate straight line of the curves interconnecting the dots (dark points) in the x-y rectangular coordinate system of an original picture can be obtained (in FIG. 3, however, the curves and the approximate straight line are in agreement).

This will be explained with reference to FIG. 4. It is assumed that a number of dots (points to be processed) to be Hough transformed are on a curve in the x-y coordinate plane (original picture plane) in FIG. 4(a). In FIG. 4(a) three approximate straight lines $L_1,L_2,L_3$ interconnecting the dots can be depicted. When all the dots are subjected to Hough transform as in FIG. 2, three points of intersections of the sine curves are obtained. The three points of intersection have coordinates $(\rho_{t1},\theta_{t1})$, $(\rho_{t2},\theta_{t2})$, $(\rho_{t3},\theta_{t3})$ in FIG. 4(a). When the occurrence of the point of intersection H is expressed by a $\rho,\theta,H$ coordinate system, FIG. 4(b) is given. Accordingly, the approximate straight lines $L_1 \sim L_3$ of FIG. 1(b) corresponding to the shoulder lines 4 of the road 3 can be given in values of $\rho$ and $\theta$ at a peak of H (the occurrence of the point of intersection).

But it is not easy to apply the above described given, based on coordinates $(x_p, y_p)$ of the point P to be Hough transformation to high speed picture processing in real time. That is, when a Hough curve (sine curve) is given, based on coordinates $(x_p,y_p)$ of the point P to be processed on the original picture of FIG. 2 as data, $$\rho=x_p \cdot \sin\theta + y_p \cdot \cos\theta \tag{1}$$

must be satisfied. For example, when $\rho$ is divided into 512 sections, the trigonometric function calculation has to be performed 1024 times: the multiplication, 1024 times; and the addition, 512 times. Besides, when the original picture to be subjected to the computation comprises 512×512 picture elements, the computation times totally become so numerous that the processing time becomes extremely long with a usual processor.

Of course it is possible to shorten the computation time by storing values of $\sin\theta$ and $\cos\theta$ used in the above described formula 1 in a ROM or others (e.g., Hanahara et al., A realtime Processor for Hough Transform, 1985 National Conference of Information System Group, The Institute of Electronics Information and Communication engineers No. 92 or Onda et al. A Hardware Implementation of Hough Transform with ROM, The 70th Anniversary General National Conference of the Institute of Electronics Information and Communication Engineers, No. 1587). But in Hanahara et al., in which the data of the trigonometric calculation are stored in a ROM, the multiplication times for the Formula 1 is still the same, and taking it into account the computation time is considerably longer compared with the addition time, this method cannot provide a fundamental solution.

Onda et al. will be discussed from a different viewpoint. In this method, the computing units for computing the above described Formula 1 are parallelled so as to speed up the overall signal processing. But this parallelism requires the same number of memory tables (ROMs) so as to obtain $x_p \cdot \sin\theta$, $y_p \cos\theta$ as the parallelled computing units. Consequently the system in terms of hardware becomes very large sized.

This method is not suitable for LSI. The data may be stored in a RAM in place of a ROM, but this has problems with integration As described above, it has been almost impossible to control in real time a vehicle running at a high speed based on the picture data and recognize in real time an object to be observed moving at a high speed based on The picture data. The speed up of the signal processing by means of parallelled computing units inevitably results in large sizes of the hardware.

A first object of this invention is to provide a picture processing device which enables not only picture data to be processed at high speed and in real time, but also the hardware to be miniaturized.

A second object of this invention is to provide a picture processing system which is able to perform the picture data processing Hough transform is applied to at high speed and in real time.

SUMMARY OF THE INVENTION

The picture processing device according to a first embodiment of this invention is for differentiating a plurality of points within an original picture taken by picturing means to extract out points characteristic of the original picture. The picture processing device comprises digital differential analysis (hereinafter DDA) computing means comprising a plurality of DDA computing devices of the same structure serially connected; memory means for storing the computation results of the DDA computing means in accordance with the DDA computing devices; and extraction means for extracting points characteristic of the original picture, based on the stored contents of the memory means.

The picture processing device according to the first embodiment is also for deriving an approximate straight line interconnecting a plurality of points to be processed on an original picture taken by picturing means. The picture processing device comprises DDA computing means for computing a rotary motion recurrence formula $$a_{i+1} = f_\alpha(\alpha_i, \beta_i, \epsilon)$$

$$\beta_{i+1} = f_\beta(\alpha_i, \beta_i, \epsilon)$$

where one point on the circumference of an approximate circle depicted on an $\alpha\ \beta$ rectangular coordinate system has coordinates $(\alpha_i, \beta_i)$, and a rotation angle from the coordinates to next coordinates $(a_{i+1}, \beta_{i+1})$ on the circumference is represented by $\epsilon$ (but i is a positive integer); memory means for storing values of at least said $\beta_i$ of the computation results given sequentially by the DDA computing means; and approximate straight line deriving means for deriving the approximate straight line of points of intersections of Hough curves which are given at the respective points to be processed based on the stored contents of the memory means.

The picture processing device according to a second embodiment of this invention is for discriminating to extract curves interconnecting a plurality of points to be processed on an original picture taken by picturing means, based on a characteristic of distributions of the points to be processed. The picture processing device comprises initial value computing means for computing an initial value based on the points to be processed on the original picture; DDA computing means comprising a plurality of DDA computing devices of the same structure serially connected for performing sequentially computing operations starting with the initial value; memory means for storing computed results of the DDA computing means in accordance with the DDA computing devices; and means for discriminating to extract the curves interconnecting the points to be processed, based on the contents stored by the memory means.

The picture processing device according to the second embodiment is also for deriving an approximate straight line of curves interconnecting a plurality of points to be processed on an original picture taken by picturing means. The picture processing device comprises initial value computing means for computing coordinates $(\alpha_i, \beta_i)$ of an initial value in an $\alpha\ \beta$ rectangular coordinate system, based on the points to be processed on the original picture; DDA computing means for repeatedly computing a rotary motion recurrence formula upon each rotation by a set rotation angle from the coordinates $(\alpha_i, \beta_i)$ of the initial value, the rotary recurrence formula being $$a_{i+1} = f_\alpha(\alpha_i, \beta_i, \epsilon)$$

$$\beta_{i+1} = f_{62}(\alpha_i, \beta_i, \epsilon)$$

where one point on the circumference of an approximate circle depicted on an u $\beta$ rectangular coordinate system has coordinates $(\alpha_i, \beta_i)$, and a rotation angle from the coordinates to next coordinates $(\alpha_{i+1}, \beta_{i+1})$ on the circumference is represented by $\epsilon$ (but i is a positive integer); memory means for storing values of at least said $\epsilon_i$ of the computed results given sequentially by the DDA computing means; and approximate straight line deriving means for deriving the approximate straight line of points of intersections of Hough curves which are given at the respective points to be processed based on the stored contents of the memory means.

The picture processing system according to a third embodiment of this invention is for discriminating to extract curves interconnecting a plurality of points to be processed on an original picture, based on a characteristic of distributions of the points to be processed. The system comprises a first step computing a rotary motion recurrence formula $$a_{i+1} = f_\alpha(-60_i, \beta_i, \epsilon)$$

$$\beta_{i+1} = f_\beta(\alpha_i, \beta_i, \epsilon)$$

where one point on the circumference of an approximate circle depicted on an $\alpha\ \beta$ rectangular coordinate system has coordinates $(\alpha_i, \beta_i)$, and a rotation angle from the coordinates to next coordinates $(\alpha_{i+a}, \beta_{i+1})$ on the circumference is represented by $\epsilon$ (but i is a positive integer) sequentially every rotation by said rotation angle or every plural rotations by said rotation angle along the entire circumference of said approximate circle or a part of the circumference thereof to thereby give Hough curves with respect with the respective points to be processed on the original picture and a second step of deriving approximate straight lines of the curves interconnecting the points to be processed, based on points of intersection between at least two of the Hough curves given in the first step. A picture processing system according to the third embodiment is also for discriminating to extract curves interconnecting a plurality of points to be processed on an original picture taken by picturing means, based on a characteristic of a distribution of the points to be processed thereon. The system comprises a first step of giving coordinates ($\alpha_0$, $\beta$) of an initial value in $\alpha$ $\beta$ coordinate system based on the points to be processed on the original picture; and a second step of computing a recurrence formula $$\alpha_{i+1} = f_\alpha(\alpha_i, \beta_i, \epsilon)$$

$$\beta_{i+1} = f_\beta(\alpha_i, \beta_i, \epsilon)$$

where one point on the circumference of an approximate circle depicted on an $\alpha\beta$ rectangular coordinate system has coordinates ($\alpha_i$, $\beta_i$), a rotation angle from the coordinates to next coordinates ($\alpha_{i+1}$, $\beta_{i+1}$) on the circumference is represented by $\epsilon$ (but i is a positive integer) sequentially every rotation by the rotation angle from the initial value given in the first step; a third step of giving Hough curves with respect to the points to be processed, based on the computed results in the second step; and a fourth step of deriving an approximate straight line of a curve interconnecting the points to be processed, based on points of intersection between at least two of the Hough curves given by repeating the steps 1 to 3 on the respective points to be processed.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENT

Figure 5:
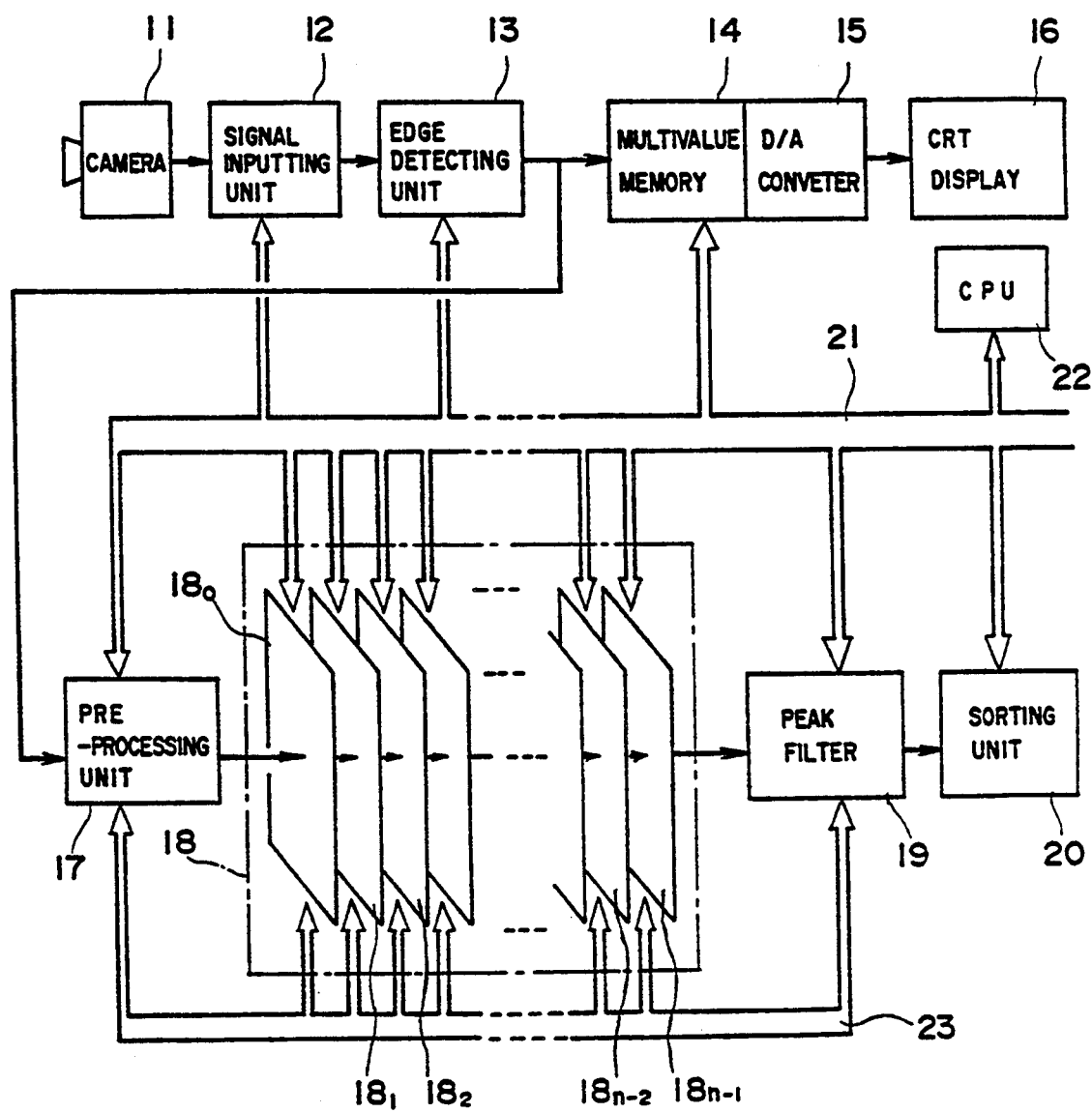
FIG. 5 is a block diagram of the overall picture processing device according to one embodiment of this invention.

As shown in the block diagram of FIG. 5, a camera 11 takes a picture of an object to be processed (e.g., a road, a high speed moving object, or the like) as an original picture. The picture signals are digitized by a signal inputting unit 12 to be supplied to an edge detecting unit 13. As will be described later, the edge detecting unit 13 extracts the edges of the picture signals to produce edged data having different brightnesses, e.g., 512×512 picture element signals (edged picture element signals) and supplies the same to a multivalued memory 14. The multivalued memory 14 stores the edged data for the respective picture elements. Each time one display screen has been scanned, the edged data are supplied to a D/A converting unit 15 to be supplied to a CRT display 16 as analog signals. Thus, the edged data are displayed on the CRT display 16 pre-processing.

On the other hand, the edged picture element signals are supplied to a pre-processing unit 17 to be processed as will be described later. The pre-processed edged picture element signals are supplied to a DDA computing unit 18. The DDA computing unit 18 comprises DDA computing circuits $18_0 \sim 18_{n-1}$ which are connected serially. A peak filter 19 and a sorting unit 20 are connected to the DDA computing unit 18 on the side of the output thereof for the processing by the peak filter and by the sorting unit (which will be described later). The above described circuit elements are connected to a CPU 22 through a VME bus 21 for control of the signal processing operation and synchronization of the processing timing. The pre-processing unit 15, the DDA computing unit 18, and the peak filter 19 are interconnected by a VME bus 23 for synchronization control of the transfer of the computation result of the DDA computing unit and that of brightness value data.

Figure 6:
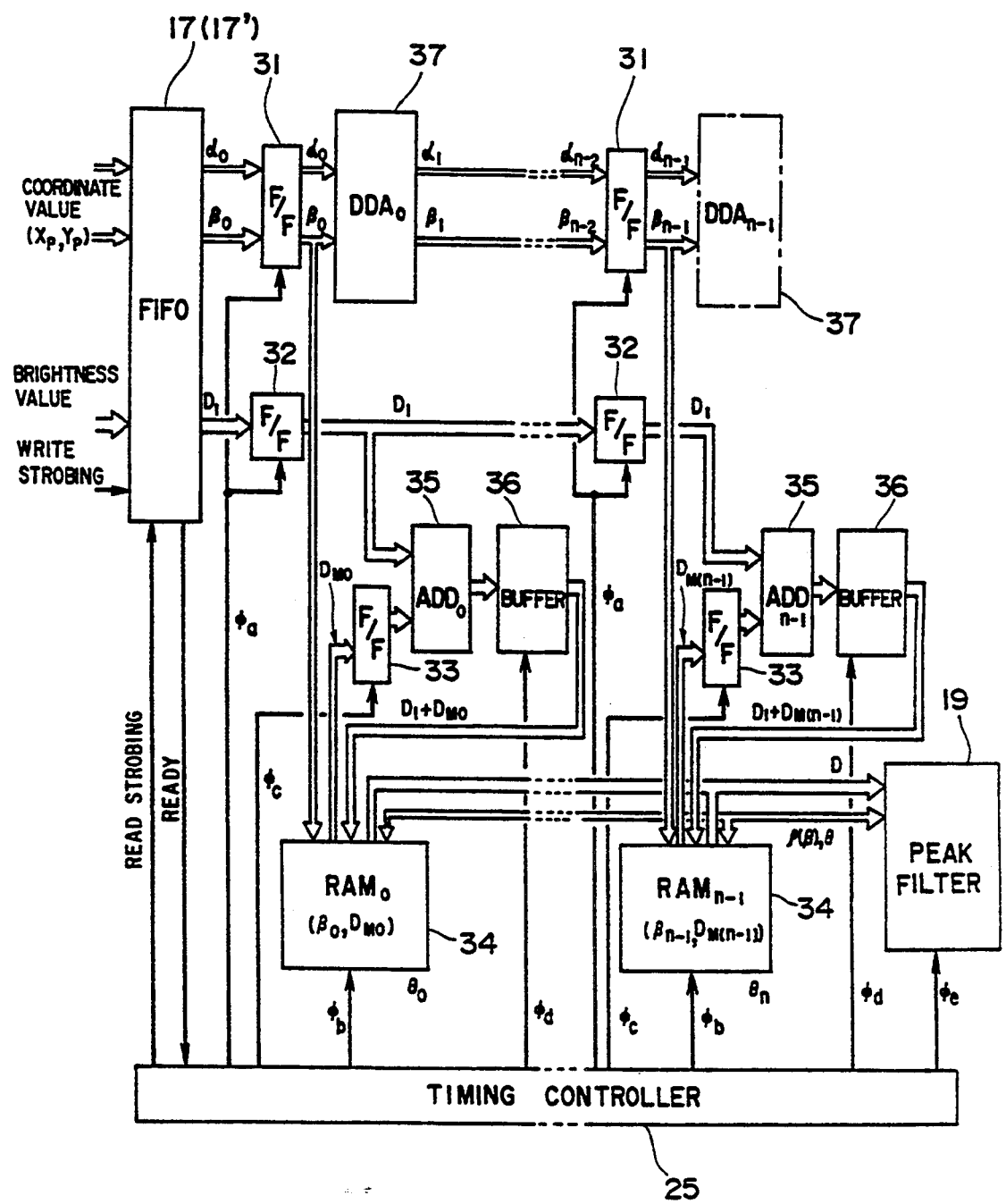
FIG. 6 is a block diagram of a major part of the device of FIG. 5.

FIG. 6 is a block diagram of the major part which corresponds to the pre-processing unit 17, the DDA calculating unit 18 and the peak filter 19 in FIG. 5. The pre-processing unit 17 is provided by a FIFO (first in first out) board 17'. The FIFO 17' inputs as an address signal coordinate values $(X_p, X_p)$ in X-Y plane of a point to be processed, and edged brightness value data $D_I$ as a data signal. As will be described later, the FIFO 17' transforms X-Y coordinates to x-y coordinates, sets a window, and processes a threshold value to output the results sequentially FIFO.

Each DDA computing circuit $18_0 \sim 18_{n-1}$ in FIG. 5 comprises three flip flops (F/Fs) 31,32,33, a random access memory (RAM) 34, an adder (ADD) 35, and a digital differential analyzer (DDA) 37. The respective F/Fs 31 temporarily store address signals $\alpha_0 \sim \alpha_{n-1}$, $\beta_0 \sim \beta_{n-1}$. The respective F/Fs 32 store brightness value data $D_1$. Each F/Fs 33 temporarily store histogram data $D_{MO} \sim D_{M(n-1)}$ read from respective RAMs 34 (RAM$_O$ - RAM$_{n-i}$). Respective DDAs 37 (DDA$_O \sim$ DDA$_{n-1}$) compute a rotary motion recurrence formula which will be described later, every rotation by a rotation angle. The respective DDAs 37 are inputted with address signals $\alpha_i, \beta_i$ to output address signals $\alpha_{i+1}, \beta_{i+1}$. Respective ADDs 35 (AD-D$_O \sim$ ADD$_{n-1}$), adders, add the brightness value data $D_I$ from the FIFO 17' and the histogram data $D_{MO} \sim D_{M(n-1)}$. The outputs from the respective ADDs are temporarily stored in a buffer 36 and then supplied to the respective RAM$_O \sim$ RAM$_{n-1}$. A timing controller 25 outputs timing pulses $\phi_a \sim \phi_e$ to control the timing of The signal processing among these circuit elements and is connected to a command/status interface not shown.

Figure 7:
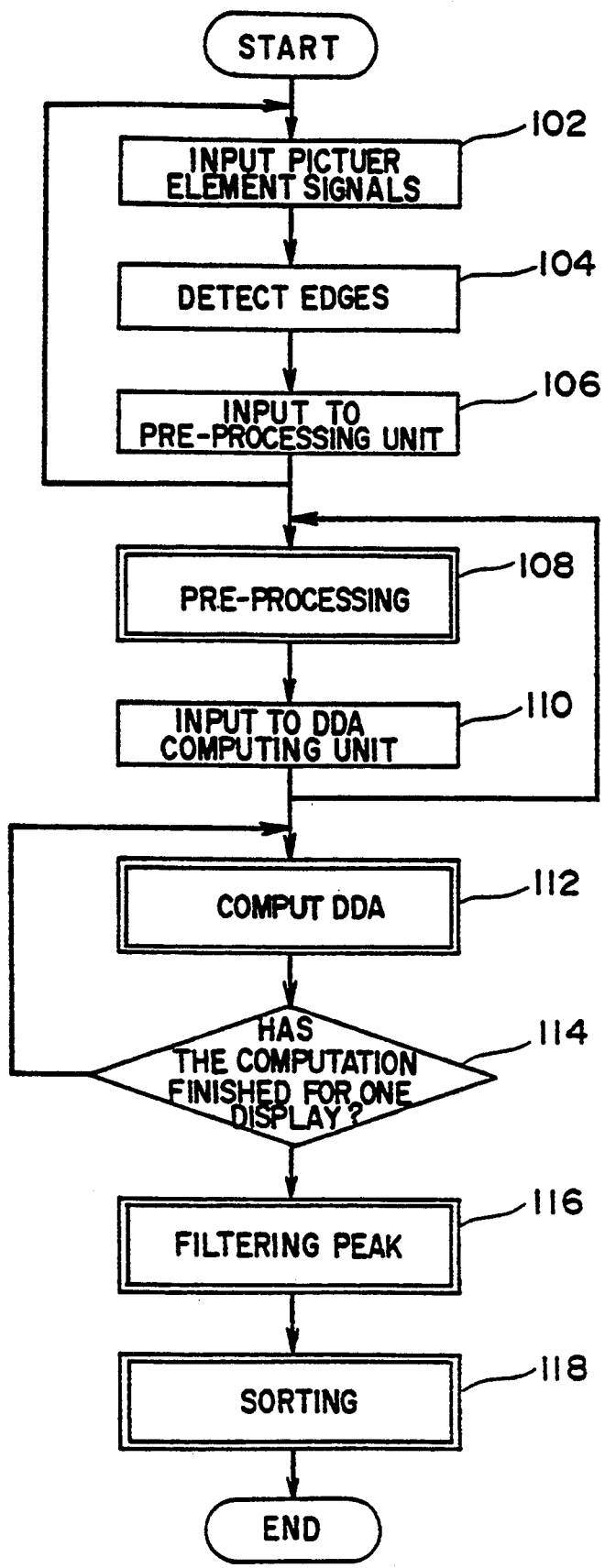
FIG. 7 is a flow chart of the operation of the device.

The overall operation of the picture processing device of FIGS. 5 and 6 is shown by the flow chart of FIG. 7. Picture signals of respective points to be processed on the original picture taken by the camera 11 are inputted by way of the signal inputting unit 12 (Step 102). The edge detecting unit 13 detects the edges of the picture signals (Step 104) and supplies the edged data to the pre-processing unit 17 (Step 106). These Steps 102 to 106 are repeated every time picture signals are inputted. The results (edged data) are sequentially supplied to the pre-processing unit 17 as digital data.

The pre-processing unit 17 executes a set pre-processing processing (which will be described later) (Step 108) and supplies processed data to the DDA computing unit 18 (Step 110). This pre-processing is repeated sequentially every time the pre-processing unit 17 is supplied with the edged data.

Subsequently, the rotary motion recurrence formula for giving Hough curves (sine curve) are executed by the DDA computing units 18 which will be explained later (Step 112). A computing operation continues until all the picture signals of one display (original picture display) to be processed except those out of a window or below a threshold value have been processed (Step 114). Then a filtering operation (Step 116) and a sorting operation (Step 118) both of which will be explained later are executed with respect to the points of intersection of the resultant Hough curves are executed by the approximation filter 19 and the sorting unit 20. The final result is an approximate straight line of curves interconnecting the points to be processed on the original picture.

Figure 8:
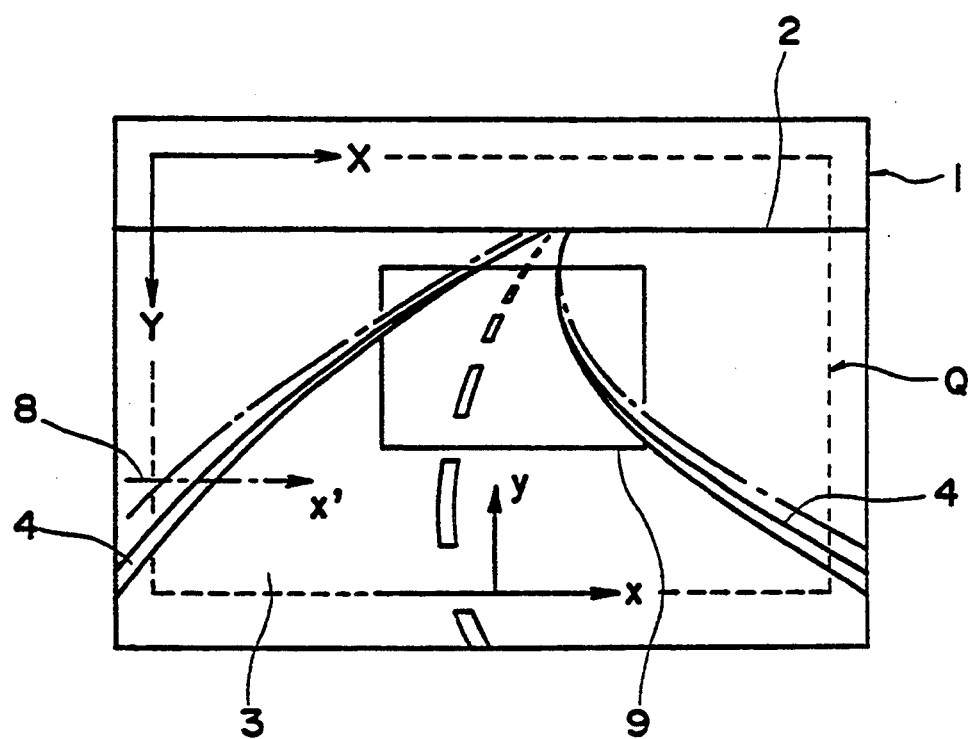
FIGS. 8(a)–(d) are views explaining the edge detection for the picture element signals inputted as an example of original pictures.
Figure 8:
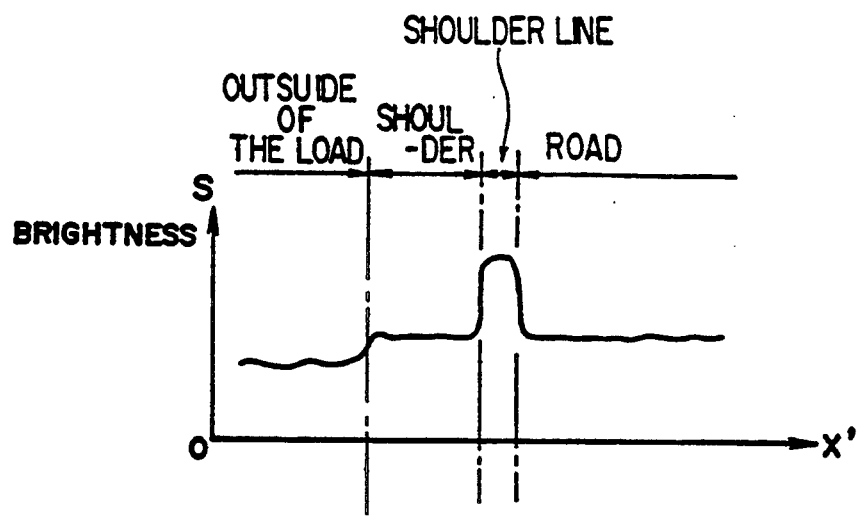
Figure 8:
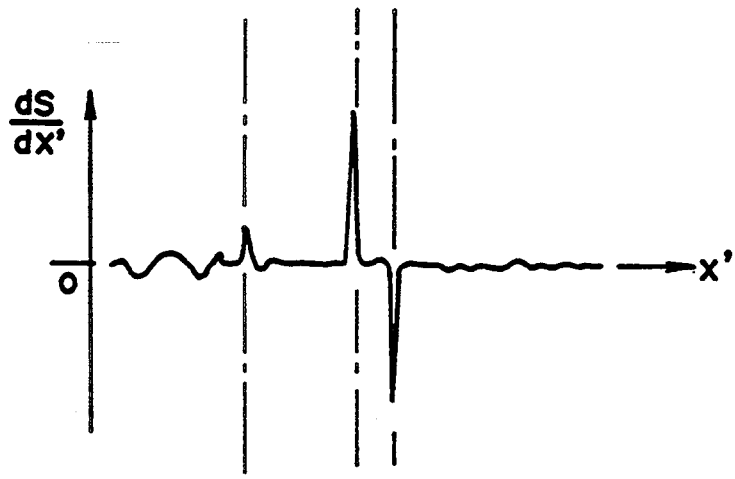
Figure 8:
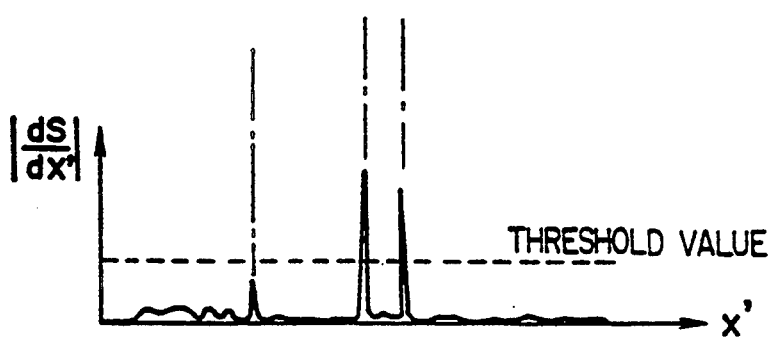

Next, the edge detection performed by the edge detecting unit 13, and the edged data are shown in FIG. 8.

It is assumed that an original picture taken by the camera is as shown in FIG. 8(a). When the line indicated by reference numeral 8 in FIG. 8(a) is set as x' axis, brightness S is expressed analogously as in FIG. 8(b). That is, the brightness is lower at the outside parts of the road 3, the road 3 and the shoulders but much higher at the shoulder lines 4. The brightness distribution of FIG. 8(b) is recognized as digital data of, e.g., 256 gradation in this embodiment, but only such brightness distribution is not sufficient for accurate recognition of the configuration of the road.

Here, brightnesses S of the picture signals supplied by the signal inputting unit 12 are differentiated $|dS/dx'|$ on the axis x' to give the brightnesses in change ratios. Then definite edges are obtained as shown in FIG. 8(c). The edges are given in absolute value $1Ds/dx'1$ as shown in FIG. 8(d). The edge detecting unit 13 supplies edged data (digital data) for exact recognition of the edges of the shoulder lines 4. The edged data from the edge detecting unit 13 are subjected to the pre-processing by the pre-processing unit 17 in the next step.

Figure 9:
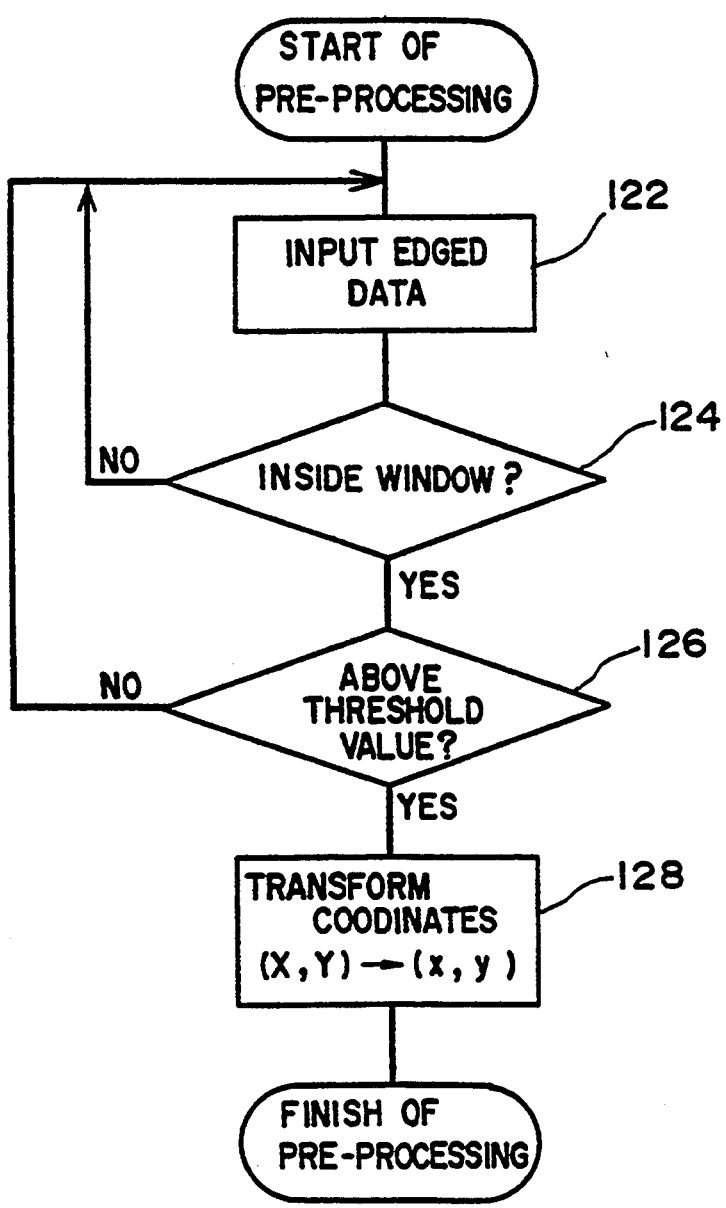
FIG. 9 is a flow chart of the pre-processing of the edged data.

The pre-processing by the pre-processing unit 17 (FIFO 17') is shown by the flow chart of FIG. 9.

The edged data produced as in FIG. 8 are supplied from the edge detecting unit 13 to the pre-processing unit 17 (Step 122) to be judged with respect to whether or not the edged data are inside a preset window (Step 124). The window is set, for example, as indicated by reference numeral 9 in FIG. 8(a). Whether or not the edged data are within the window is judged based on the coordinate values of the edged data in x-y coordinate plane. The next step 126 is executed on only those of the edged data which are inside the window 9.

Figure 10A:
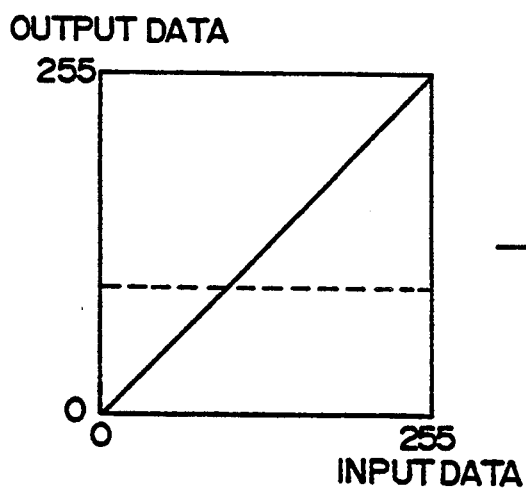
FIGS. 10(a) and (b) are views explaining the lookup table.
Figure 10B:
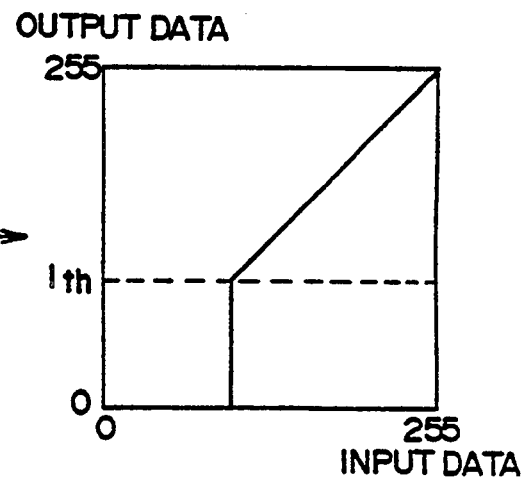

In Step 126, the edged data inside the window 9 are digitally judged with respect to whether the edged data inside the window are above a required threshold level, based on, e.g., a lookup table (LUT) affixed to the FIFO 17'. That is, as shown in FIG. 10, without the LUT, input data to and output data from the FIFO 17' correspond to each other in a ratio of 1:1 (FIG. 10(a)).

But, in the case where a threshold level is set at $I_{th}$, using the LUT, the output data is 0 when the input data is below $I_t$h. In the case where the edged data are produced in 256 gradation, the threshold level $I_{th}$ can be set arbitrarily in a range of 0~255. When this threshold level is analogously expressed, it is set as indicated by the dot line in FIG. 8(d). Accordingly, the data surviving the processing of Step 126 are mainly those (digital data) corresponding to the shoulder lines 4 and the center line 5 in the original picture. That is, only major data (of, e.g., the shoulder lines and the center line of the road) are left to be signal processed in the following steps. Accordingly, there is no influence of noise components, and the overall processing speed can be improved.

Next, the coordinate transformation is performed in Step 128. That is, as shown in FIG. 8(a), the coordinate transformation is performed from the X-Y coordinate system to the x-y coordinate system. Accordingly the coordinates $(X_p, Y_p)$ of the point to be processed is transformed to the coordinates $(x_p, y_p)$. At this point the preprocessing is complete.

In FIG. 9, the sequence of Steps 124~128 may be changed. For example, Step 128 of performing the coordinate transformation may be performed first. Taking the data processing time into consideration, the sequence of FIG. 9 is most preferable.

Figure 11A:
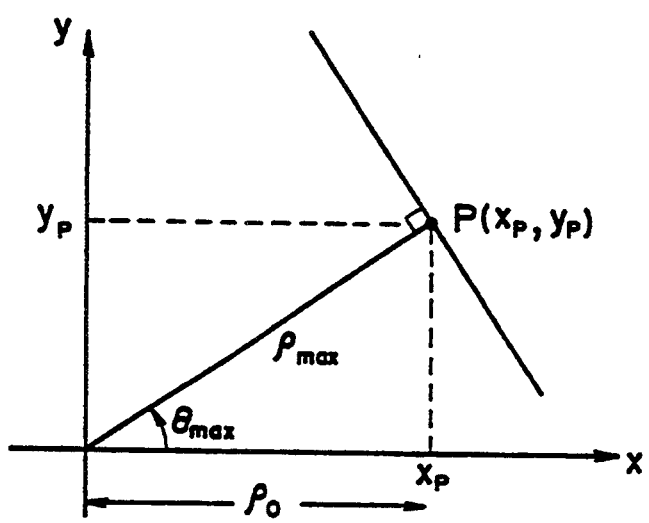
FIGS. 11 (a)–(c) are views explaining the Hough transform in the embodiment.
Figure 11B:
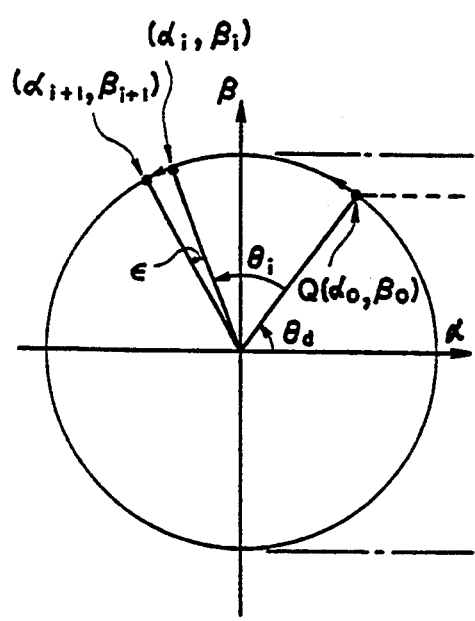
Figure 11C:
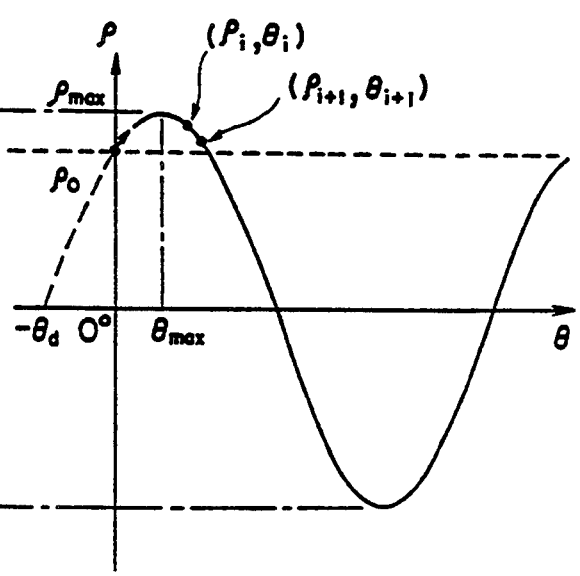
Figure 12:
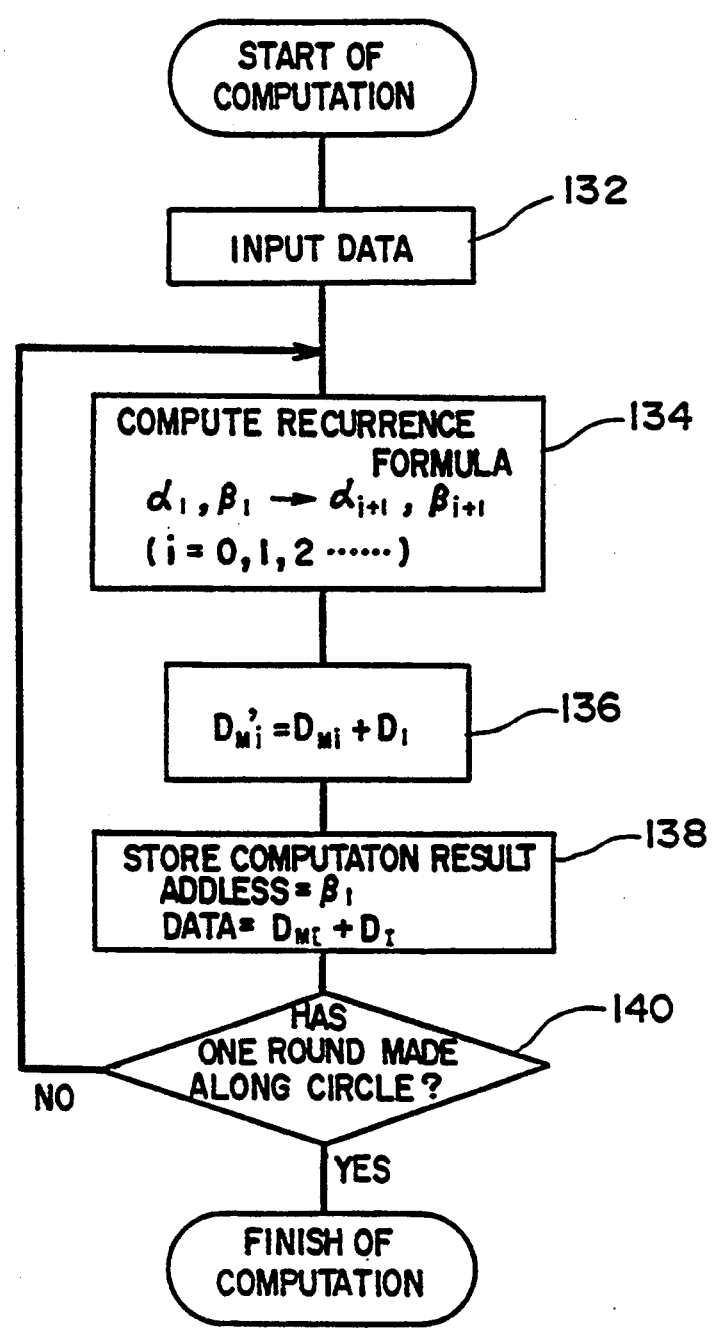
FIG. 12 is a flow chart of a computing operation of the rotary motion recurrence formula in the embodiment.

The application of the Hough transform to this embodiment is shown in FIGS. 11 and 12.

When a Hough curve (sine curve) is obtained with respect to the point $P(x_p, y_p)$ in FIG. 11(a), the Hough curve shown in FIG. 11(c) will be given, as explained above with reference to FIG. 12. It is seen from the trigonometric function theorem that the trajectory of such sine curve may be replaced with that of a circular motion of FIG. 11(b). In other words, obtaining a trajectory of the circumference of the circular motion of FIG. 11(b) is equivalent to performing the Hough transformation with respect to the point P($x_p,y_p$) in FIG. 11(a) to obtain the Hough curve of FIG. 7(c).

$$R = \rho_{max} = (x_p^2 + y_p^2)^{\frac{1}{2}} \quad (2)$$

When the circular motion is started at a point Q ($\alpha_0,\beta_0$) in FIG. 11(b) corresponding to $\theta=0°$ at the point p($x_p,y_p$), the initial value $\theta_d$ is given by the formula $$\theta_d = \pi/2 - \theta_{max}$$

where $$\tan\theta_{max} = x_p/y_p \quad (3)$$

From this viewpoint, the inventors have applied a rotary motion recurrence formula in depicting the circle of FIG. 11(b) and found an easy method for transforming the point P ($x_p,y_p$) of FIG. 11(a) into the Hough curve of FIG. 11(c). Based on the rotary motion recurrence formula, coordinates ($\alpha_{i+1},\beta_{i+1}$) which is ahead of a point ($\alpha_i,\beta_i$) by the angle $\epsilon$ in $\alpha$-$\beta$ rectangular coordinate system is given by $$\alpha_{i+1} = f_\alpha(\alpha_i,\beta_i,\epsilon)$$

$$\beta_{i+1} = f_\beta(\alpha_i,\beta_i,\epsilon) \quad (4)$$

where i is an integer.

For Equation 4, several rotary motion recurrence formulas are conventionally known. In one of them, for example, when the rotation angle $\epsilon = 2^{-m}$(rad) (m=0, 1, 2, ...,)

$$\alpha_{i+1} = \alpha_i - 2^{-m}\beta_i$$

$$\beta_{i+1} = 2^{-m}\alpha_{i+1} + \beta_i \quad (5)$$

However, the rotary motion recurrence formula which the inventors have found to have higher precisions and to be easier to compute, $$\alpha_{i+1} = \alpha_i(1 - 2^{-2m-1}) - 2^{-m}\beta_i$$

$$\beta_{i+1} = 2^{-m}\alpha_i + \beta_i(1 - 2^{-2m-1}) \quad (7)$$

or $$\alpha_{i+1} = \alpha_i(1 - 2^{-2m-1}) + \beta_i(2^{-m} + \epsilon^{-3m}/6)$$

$$\beta_{i+1} = \alpha_i(2^{-m} + \epsilon^{-3m}/6) + \beta_i(1 - 2^{-2m-1}) \quad (8)$$

may be used.

In this case Recurrence Formula 7 will be used. Before the operation of the circuit of FIG. 5 is specifically explained, this computing method will be explained in good detail.

FIG. 12 is a flow chart of the computing process. The data which have been pre-processed by the FIFO 17' in accordance with the sequence of the processing steps in FIG. 9 are supplied to the DDA computing unit 18 (Step 132), and a rotary motion is started at a position Q ($\alpha_0,\beta_0$) corresponding to angle $\theta=0°$ (i.e., an angle where $\rho=x_p$) at the point to be processed P($x_p,y_p$) in FIG. 11. At this time, ($\alpha_0,\beta_0$) from the FIFO 17' is $$\alpha_0 = Y_p, \beta_0 = x_p \quad (9).$$

The initial position of the rotary motion is set by the above described method, and the initial value is substantively irrelevant for the recurrence formula computation.

Then, the value of $\beta_0$ is stored in the RAM$_0$ as an address, and then $\alpha_1,\beta_1$ are obtained by Recurrence Formula 7. This computation can be performed by substituting Formula 7 with $\alpha_0,\beta_0$ given by Formula 9 (Step 134). Every time the respective digital differential analyzers, DDA$_1$, DDA$_2$, DDA$_3$, ... finish their computation, the results ($\beta_1$, $\beta_2$, $\beta_3$, ...) are subsequently stored in RAM$_1$, RAM$_2$, RAM$_3$, ... as addresses (Step 138). On the other hand, between Steps 134 and 138, brightness data are accumulated. That is, the histogram data D$_{Mi}$ read from the RAM 34 (RAM$_i$) at the address-=$\theta_i$, and the brightness data from the FIFO 17' are added to be stored again in the RAM$_i$ (Step 136).

Figure 1A:
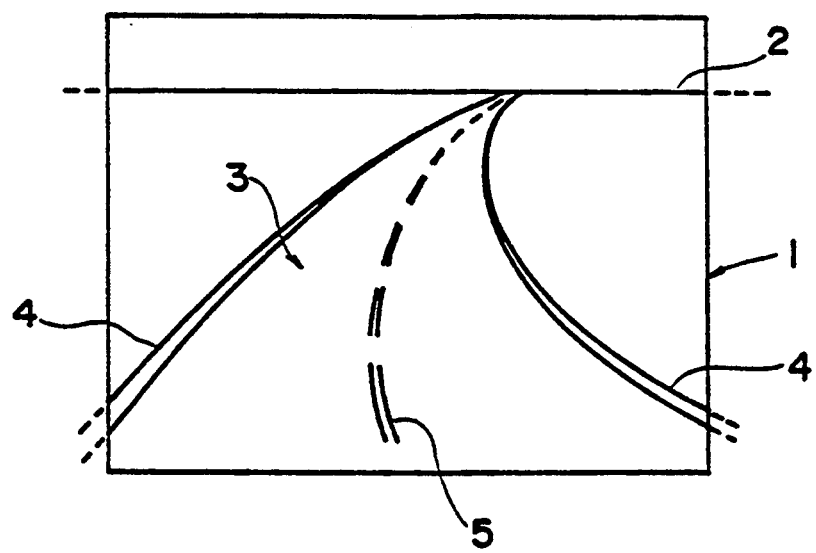
FIGS. 1(a) and (b) are views explaining recognition of the contour of a road by the picture processing device.
Figure 1B:
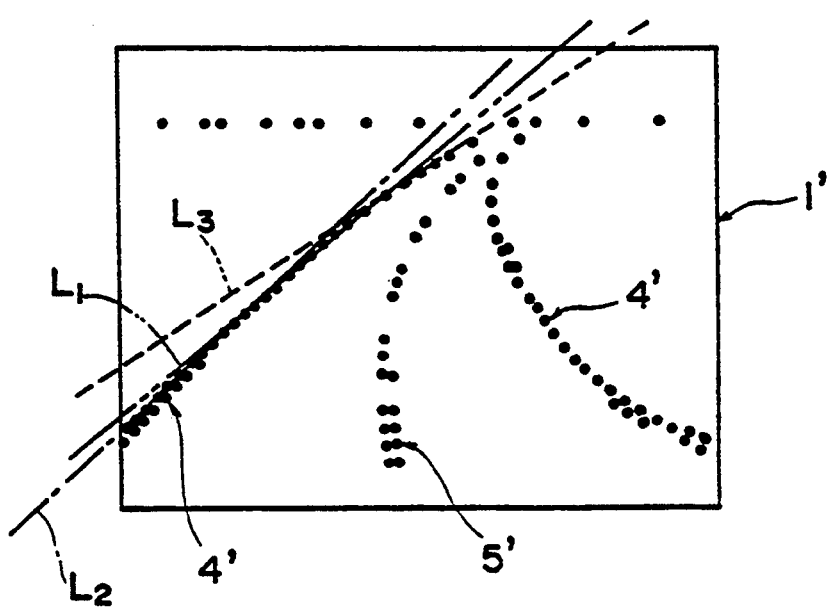
Figure 2:
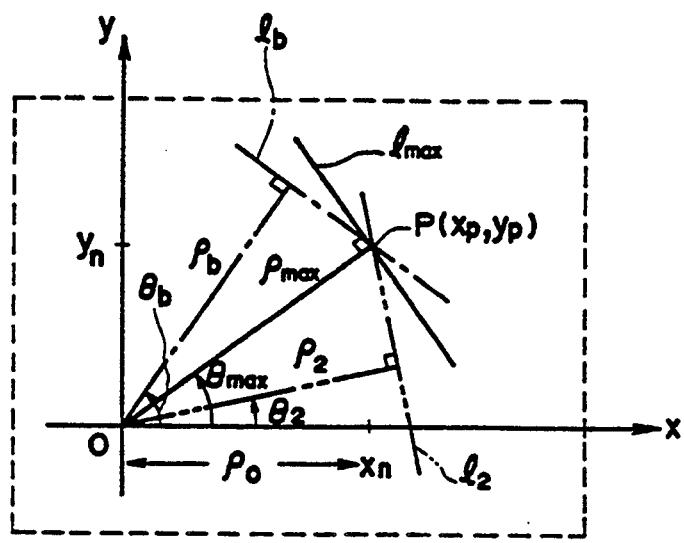
FIGS. 2(a) and (b), FIGS. 3(a) and (b), and FIG. 4(a) and (b) are views explaining the principle of Hough transform.
Figure 2:
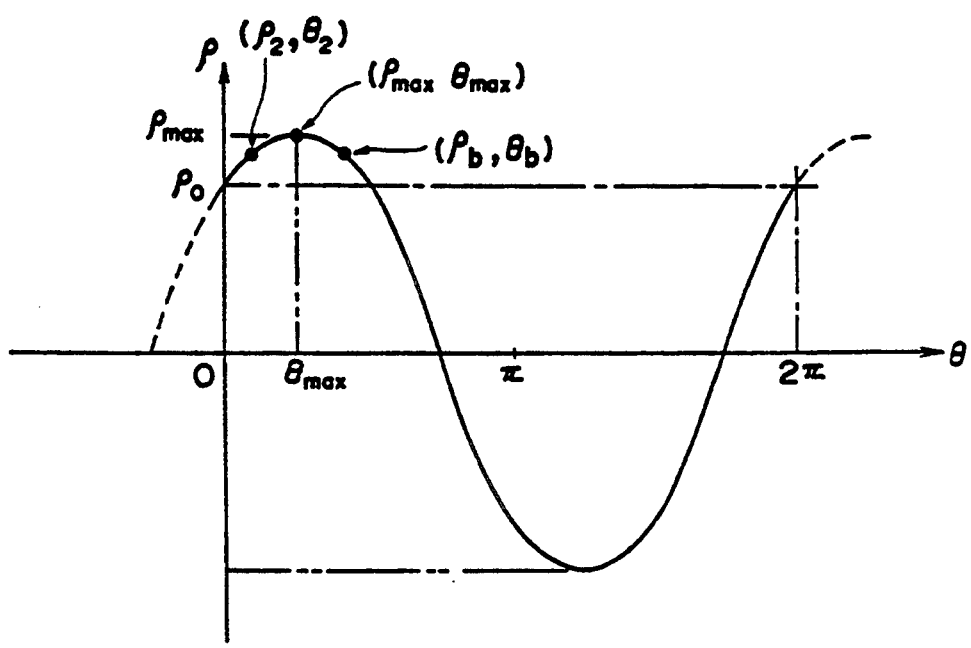
Figure 3A:
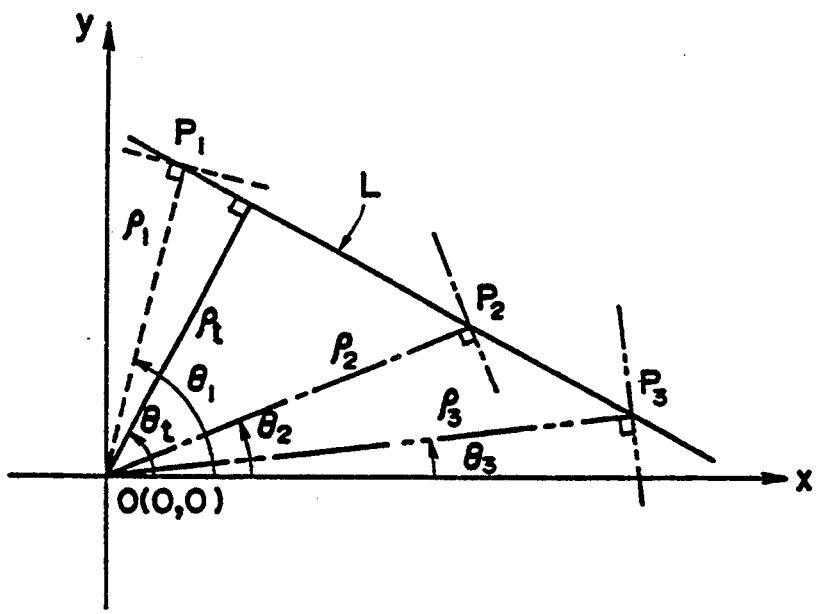
Figure 3B:
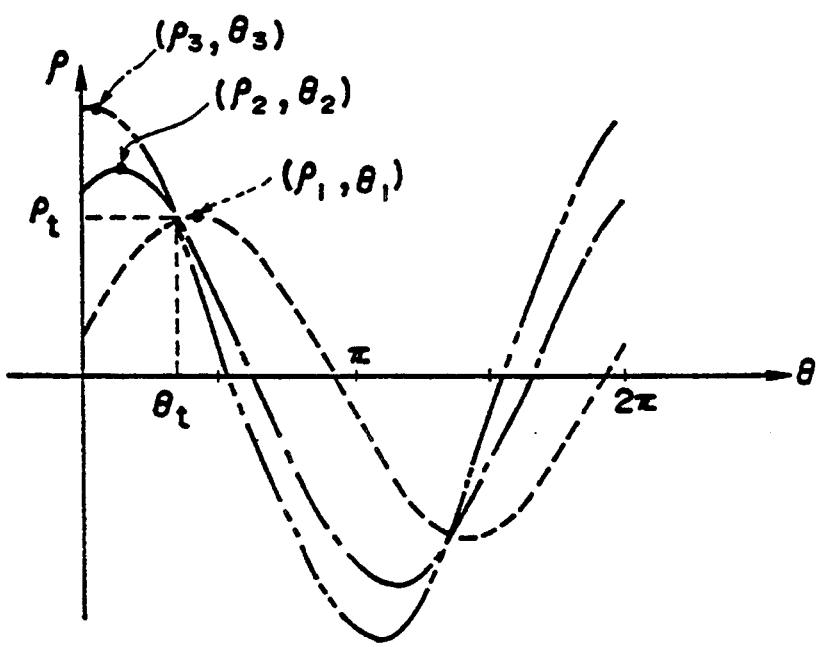
Figure 4:
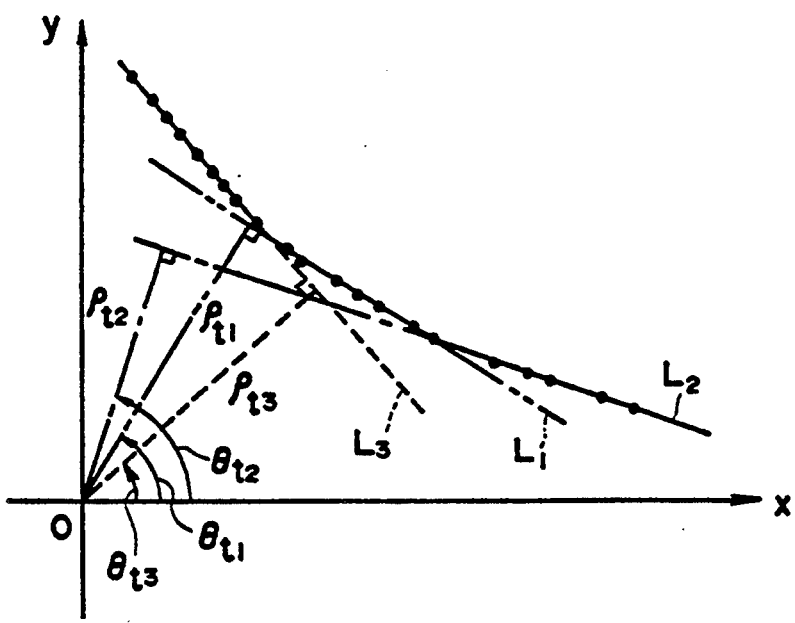
Figure 4:
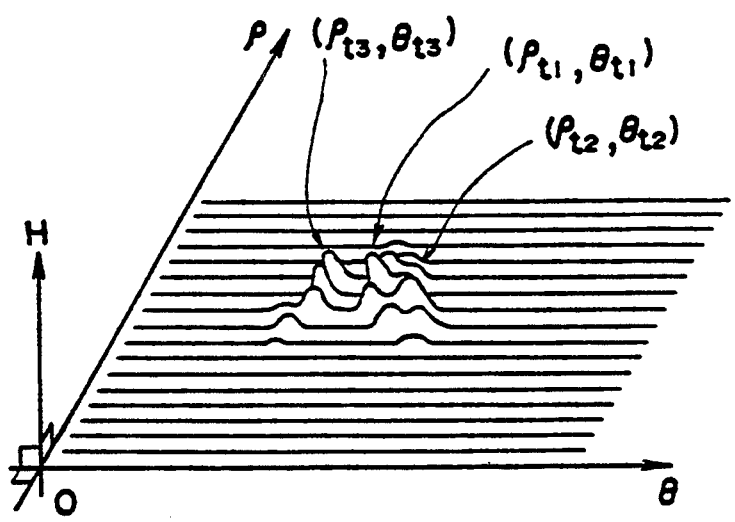

This computation is repeated each rotation by the angle $\epsilon$ until one round has been finished along a circle (Step 149). When one round has been made, a Hough curve with respect to one point to be process on an original picture is given, based on the thus stored values $\beta_0,\beta_1,\beta_2, \beta_3, \ldots$, and values (rotation angle $\epsilon$) of $\theta_0, \theta_1, \theta_2, \ldots$ and also results weighted with brightness data (D$_{M0}$, D$_{M1}$, ... D$_{M(n-1)}$) are given. When the processing of FIG. 12 is executed on all the points to be processed on the original picture, a plurality of Hough curves weighted with brightness data are given in $\rho$-$\theta$ coordinate system, and these Hough curves have points of intersection in FIG. 3(b).

Figure 13:
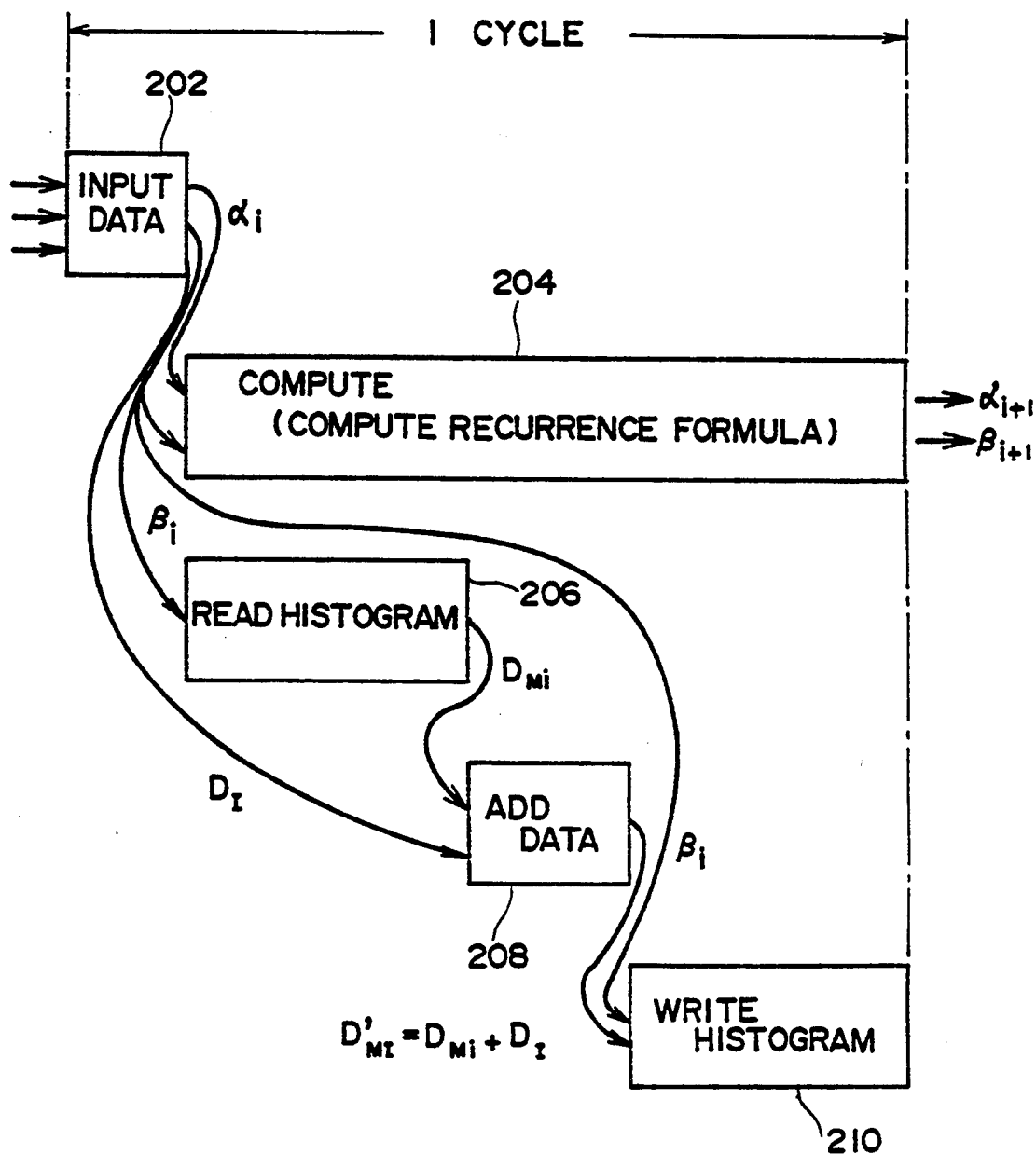
FIG. 13 is a view explaining one cycle of the processing.

The operation following the flow chart of FIG. 13 will be explained in more detail with reference to FIG. 6.

Step 132 of inputting data in FIG. 12 is executed by supplying a ready signal from the FIFO 17' in FIG. 6 to the timing controller 25 and supplying a read strobing signal from the timing controller 25 to the FIFO 17', then supplying address signal $\alpha_0,\beta_0$ corresponding to the coordinate value ($x_p,y_p$) of the point to be processed P from the FIFO 17' to the F/F 31, and then supplying brightness data D$_I$ of the point to be processed P to the F/F 32. The input of an address and data to the F/Fs 31, 32 are performed synchronously with a timing pulse $\phi_a$ from the timing controller 25. Synchronously with this timing pulse $\phi_a$, the address signals $\alpha_0$, $\beta_0$ from the F/F 31 are inputted to a first DDA$_0$ 37.

The DDA$_0$ performs the processing of Step 134 in FIG. 12. That is, the computation of Recurrence Formula 7 is performed, and the computation result (address signals $\alpha_1,\beta_1$) is supplied to a next DDA$_1$ (not shown). The Recurrence Formula 7 basically involves neither computation of the trigonometric function nor multiplication, and reference to a memory table (ROM) is not necessary either. The computation can be performed easily and promptly. This computation has sufficient precision (little error) for the rotary motion.

The address signal $\beta_0$ is supplied also to the RAM$_0$ 34. In response to this address signal the histogram data D$_{MO}$ stored in the RAM$_0$ is read out. That is, RAM$_0$ has previously stored at the address cf $\beta_0$ the histogram data D$_{MO}$ with respect to the other points to be processed every rotation by the angle $\theta_0$ ($\theta'=0$) (based on the preceding computation of the ADD$_0$). Accordingly, synchronously with the address signal $\beta_0$ supplied from the F/F 31 to the $RAM_0$, the histogram data $D_{MO}$ is supplied from the $RAM_0$ to the F/F 33.

Subsequently, in synchronization with a timing pulse $\alpha_c$ from the timing controller 25, the histogram data $D_{MO}$ is supplied from the F/F 33 to the $ADD_0$. The $ADD_0$ has been supplied by the F/F 32 with brightness data $D_I$ of the point to be processed $(x_p, y_p)$. Accordingly, in the $ADD_0$, the rotation angle $\theta_0$ which has been stored in the $RAM_0$, the histogram data $D_{MO}$ corresponding to the address $\beta_0$, the rotation angle $\theta_0$ of the point being processed $(x_p, y_p)$, and the brightness value data $D_I$ corresponding to the address $\beta_0$ are added (Step 136 in FIG. 12). The addition result ($D_{MO}'$=$D_{MO}$+$D_i$) is temporarily held by the buffer 36 and then is supplied to the $RAM_0$ in synchronization with a timing pulse $\phi_d$ to be stored at an address $\beta_0$ of the $RAM_0$ corresponding to $\theta_0$ (Step 138 in FIG. 12).

The above described one cycle of processing will be explained below in terms of the DDA computing circuit $18_i$ (i=1, 2, ... n−1) with reference to FIGS. 6 and 13.

After address signals $\alpha_i, \beta_i$ and the brightness value data $D_I$ of the point to be processed $(x_p, y_p)$ are supplied respectively from the F/F's 31 and 32 to the $DDA_i$ 37 (Step 202), the computation of the recurrence formula is executed, based on the address signals $\alpha_i, \beta_i$ in Step 204. Address signals $\alpha_{i+1}, \beta_{i+1}$, a result of the computation, are supplied to the F/F 31 positioned before the $DDA_{i+1}$ 37 in the next DDA computation circuit $18_{i+1}$ in synchronization with the finish of one cycle of processing.

Further in response to the address signal $\beta_i$, reading of the histogram data $D_{Mi}$ is performed in Step 206. This read is performed by supplying the address signal $\beta_i$ from the F/F 31 to the $RAM_i$ to store the histogram data $D_{Mi}$ at the address of $\beta_i$ in the F/F 33 in FIG. 6. In Step 208 the brightness data $D_I$ of the histogram data $D_{Mi}$ is added. Step 208 is executed by the $ADD_1$ in FIG. 6. Then, the histogram data $D_{Mi} = D_{Mi} + D_I$ is written in the $RAM_i$ at the address $\beta_0$ in Step 210.

The storing of the histogram data will be explained in more detail with reference to FIG. 14.

Figure 14:
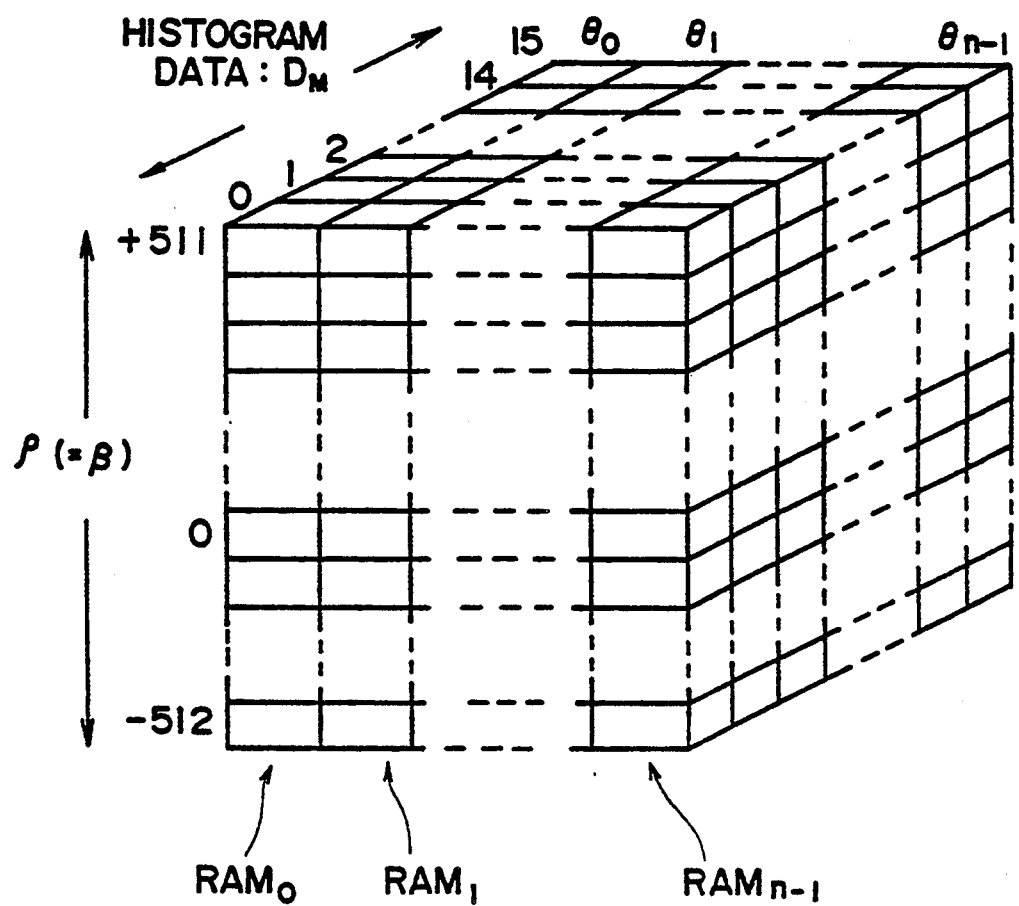
FIG. 14 is a view explaining the concept of the histogram memory.

FIG. 14 shows the concept of the histogram memory of the RAM 34 in FIG. 6. As shown, the memory has regions $RAM_0 \sim RAM_{n-1}$ which correspond respectively to the rotation angles $\theta_0 \sim \theta_{n-1}$. Each RAM region has addresses $\beta$ (=$\rho$) +511~0~−512. Each address can store 16 bit histogram data. Accordingly, when the $DDA_i$ computes $\alpha_{i+1}, \beta_{i+1}$ corresponding to the rotation angle $\theta_{i+1}$ based on the address signal $\alpha_i, \beta_i$, using Recurrence Formula 7, the address signal $\beta_i$ is supplied to the $RAM_1$, and the histogram data $D_{M(i)}$ is read and combined with the brightness data $D_I$ of a point to be processed. Then the histogram data $(D_{M(i)} + D_I)$ is written at the address $\beta_i$.

As described above, the computation of Recurrence Formula 7 is performed by the serially connected DDA computing circuits $18_0 \sim_{n-1}$ (hereinafter the "pipe line system") wherein the address signals $\alpha_i, \beta_i$ are transferred sequentially. During the computation of the address signals $\alpha_i, \beta_i$ to the address signals $\alpha_{i+1}, \beta_{i+1}$, the brightness data $D_I$ and the histogram data $D_{Mi}$, are added by the $ADD_i$ and stored in the $RAM_i$ which shortens the time required for one cycle of processing.

Figure 15A:
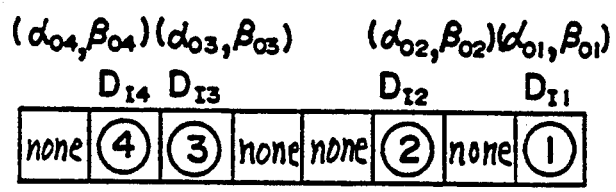
FIGS. 15(a)–(e) are views explaining the pipe line processing in the embodiment.
Figure 15B:
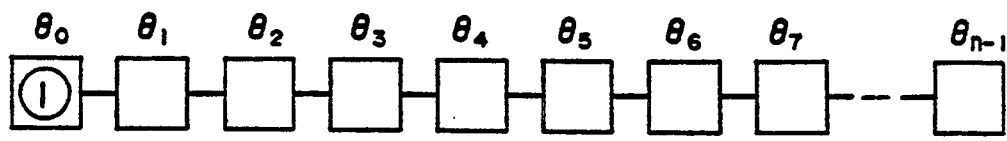
Figure 15C:
Figure 15D:
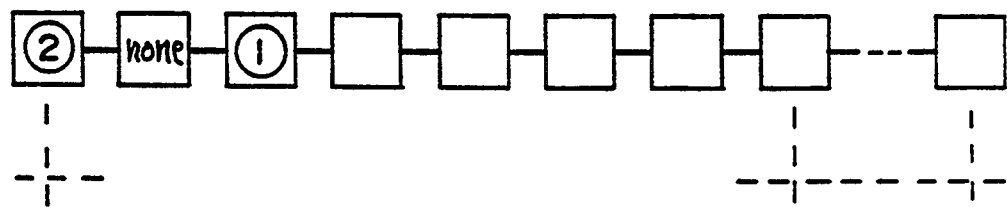
Figure 15E:

This one cycle of processing is performed by the DDA computing circuits $18_0 \sim 18_{n-1}$ simultaneously and parallelly. That is, as in FIG. 15(a), data 1,none, 2, none, none, 3, 4, none is inputted by the FIFO 17′ in the first cycle the data is as shown in FIG. 15(b), In the second cycle, the data is as shown in FIG. 15(c). In the third cycle, the data is as shown in FIG. 15(d). The same processing follows. In the eighth cycle, the data is as shown in FIG. 15(e). In FIG. 15(a), $(\alpha_{01}, \beta_{01}) \sim (\alpha_{04}, \beta_{04})$ are address signals corresponding respectively to coordinate values $(x_{p1}, y_{p1}) \sim (x_{p4}, y_{p4})$ of the points to be processed $P_1 \sim P_4$, and $D_I \sim D_I$ are brightness data of the respective points to be processed $P_1 \sim P_4$. $\theta_0 \sim_{n-1}$ are rotation angles from the points to be processed ($\theta_0$ is the points to be processed themselves) and correspond respectively to the $RAM_0$ $RAM_{n-1}$ in FIG. 6.

Next, the peak filtering following the Hough transform will be explained.

Figures 16A, 16B:
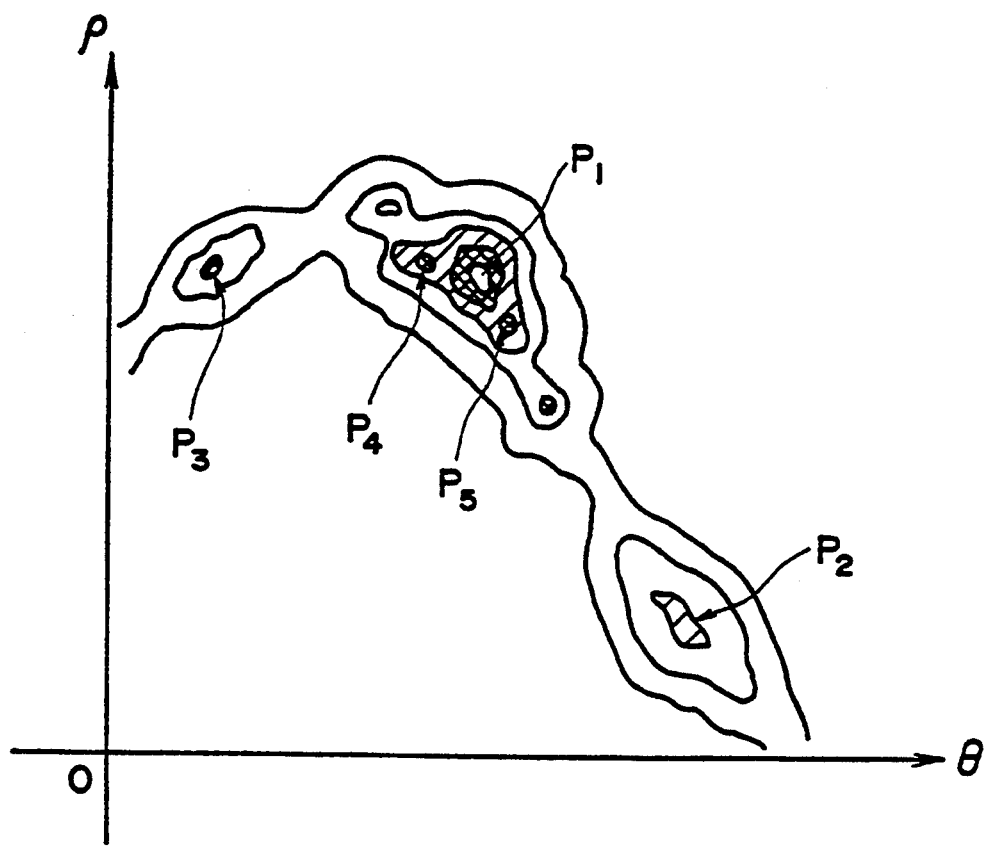
FIGS. 16(a) and (b) are views explaining the 8 neighbor filtering (peak filtering)

Here it is assumed that when the points of intersection of Hough curves ape expressed in the $\rho\theta$ plane, FIG. 16(a) is given. FIG. 16(a) does not always agree with histograms obtained by this invention, because in FIG. 16(a) histograms H which are weighted with brightness value data (brightness change ratios) of the picture elements of the original picture with respect to the points of intersection appearing every unit of the $\rho$-$\theta$ plane are expressed in the contour for easy understanding.

Here it is assumed that the histogram at the point $P_1$ in FIG. 16(a) is high and also high at the points $P_2$ and $P_3$. When the neighbors of the point $P_1$ are considered, high histograms take place at the points $P_4$ and $P_5$. But what is especially important is to to find the points $P_1$-$P_3$ spaced from each other. For example, the point $P_1$ corresponds to the shoulder lines of the road; the point $P_2$, the center line thereof; and the point $P_3$, the shoulder lines of the forward curved portion of the road. But in many cases the points $P_4$ and $P_5$ correspond to partial curves of the shoulder lines, which are, in many cases, noise components in picture processing.

An eight neighbor peak filtering, for example, lessens such noise components. That is, using an 8 neighbor filter (peek fiber), the histograms at the points of intersections of the Hough curves are compared between areas $F_1 \sim F_9$. When the formula $$F_5 > F_1 \sim F_4, F_6 \sim F_9$$

is satisfied, the data in the area $F_5$ is to be detected. Specifically, in the case, for example, where one unit (element area) of picture elements in the $\rho\theta$ plane is allocated to each area $F_1 \sim F_9$, the formula $F_5 > F_1 \sim F_4, F_6 \sim F_9$ is satisfied when the histogram number of the points of intersection are

| | | |
|---|---|---|
| $F_1 = 6$, | $F_2 = 8$, | $F_3 = 4$, |
| $F_4 = 2$, | $F_5 = 14$, | $F_6 = 10$, |
| $F_7 = 7$, | $F_8 = 9$, | $F_9 = 8$. |

Then the point of intersection $F_5$ is to be detected. In contrast to this, when

| | | |
|---|---|---|
| $F_1 = 8$, | $F_2 = 4$, | $F_3 = 3$, |
| $F_4 = 14$, | $F_5 = 10$, | $F_6 = 7$, |
| $F_7 = 9$, | $F_8 = 8$, | $F_9 = 2$, |

$F_5 < F_4$ is given and thus the area $F_5$ is not data to be detected.

Figure 17:
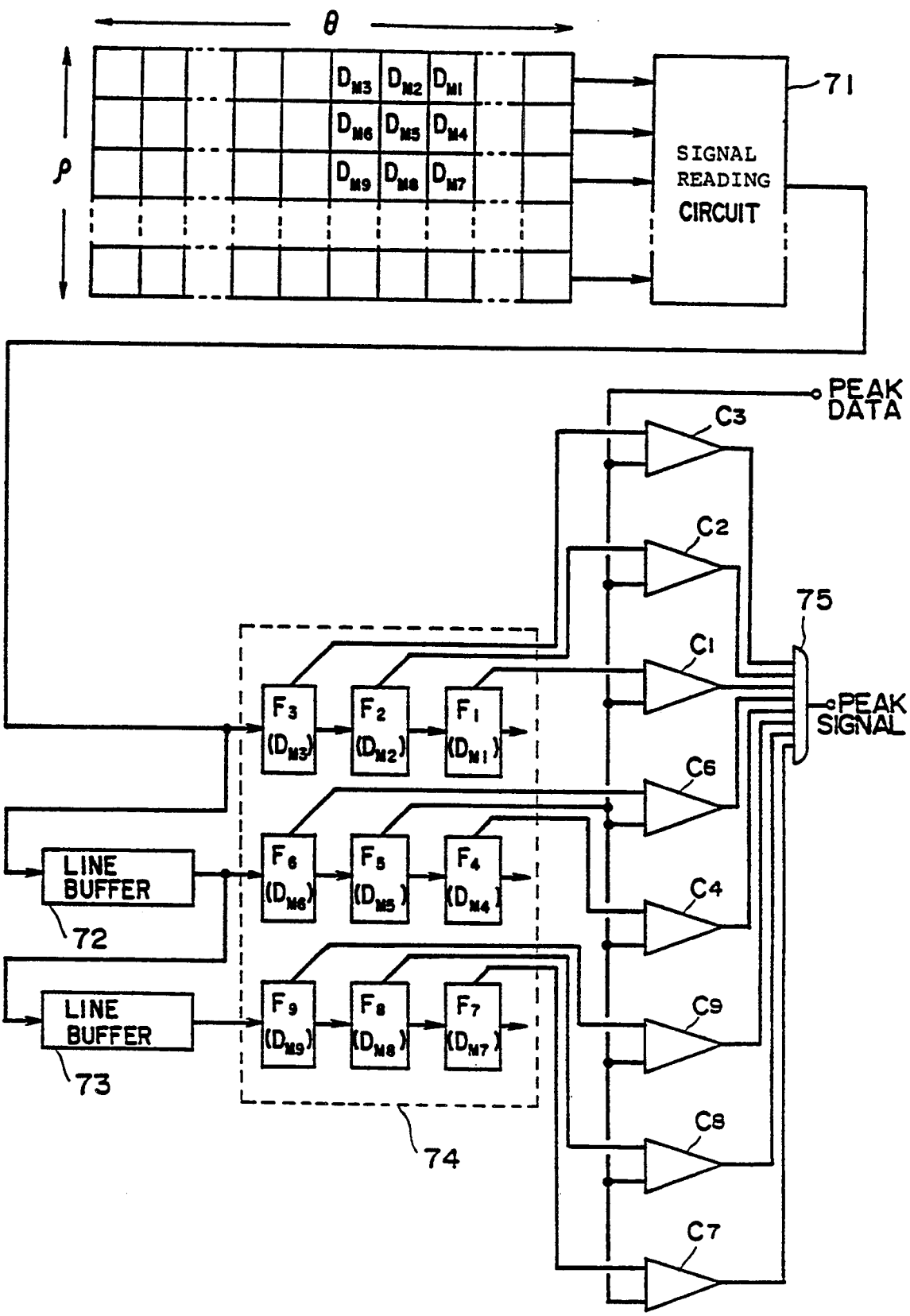
FIG. 17 is a detailed block diagram of the peak filter.

The above described filtering is performed by means of a peak filter in FIG. 17. That is, a signal reading circuit 71 is affixed to the histogram memory (RAM 34) of FIG. 14(b), and data read from the signal reading circuit 71 is supplied to a shift register 74 having nine storing region($F_1 \sim F_9$) through the line buffer 72. The histogram data $D_M$ of the registers $F_1 \sim F_4$ and those $D_M$ of the shift registers $F_6 \sim F_9$ are inputted to the comparators $C_1 \sim C_4$ and $C_6 \sim C_9$ respectively. The histogram data of the shift register $F_5$ is inputted to all the comparators. Then, when the histogram data of the respective areas of the histogram memory 34 are $DM_1 \sim DM_9$ as shown in FIG. 17, the value of the data $D_{M5}$ is compared with the rest data $D_{M1} \sim DM_4$, $D_{M6} \sim D_{M9}$. When the data $D_{M5}$ is maximum, a peak signal H is outputted from an AND gate. The data $D_{M5}$ at this time becomes a peak data.

The above described filtering makes it possible that the points $P_2$ and $P_3$ where histograms are high can be detected, free from the influence of the points $P_4$ and $P_5$ in FIG. 16(a). Without the filtering, points of the second highest histogram next to the point $P_1$ of the first highest histogram are $P_4$ and $P_5$, and the points $P_2$ and $P_3$, which have to be detected as points of the second and the third highest histograms are of the fourth and the fifth highest histograms. This makes the subsequent signal processing very difficult.

Figure 18A:
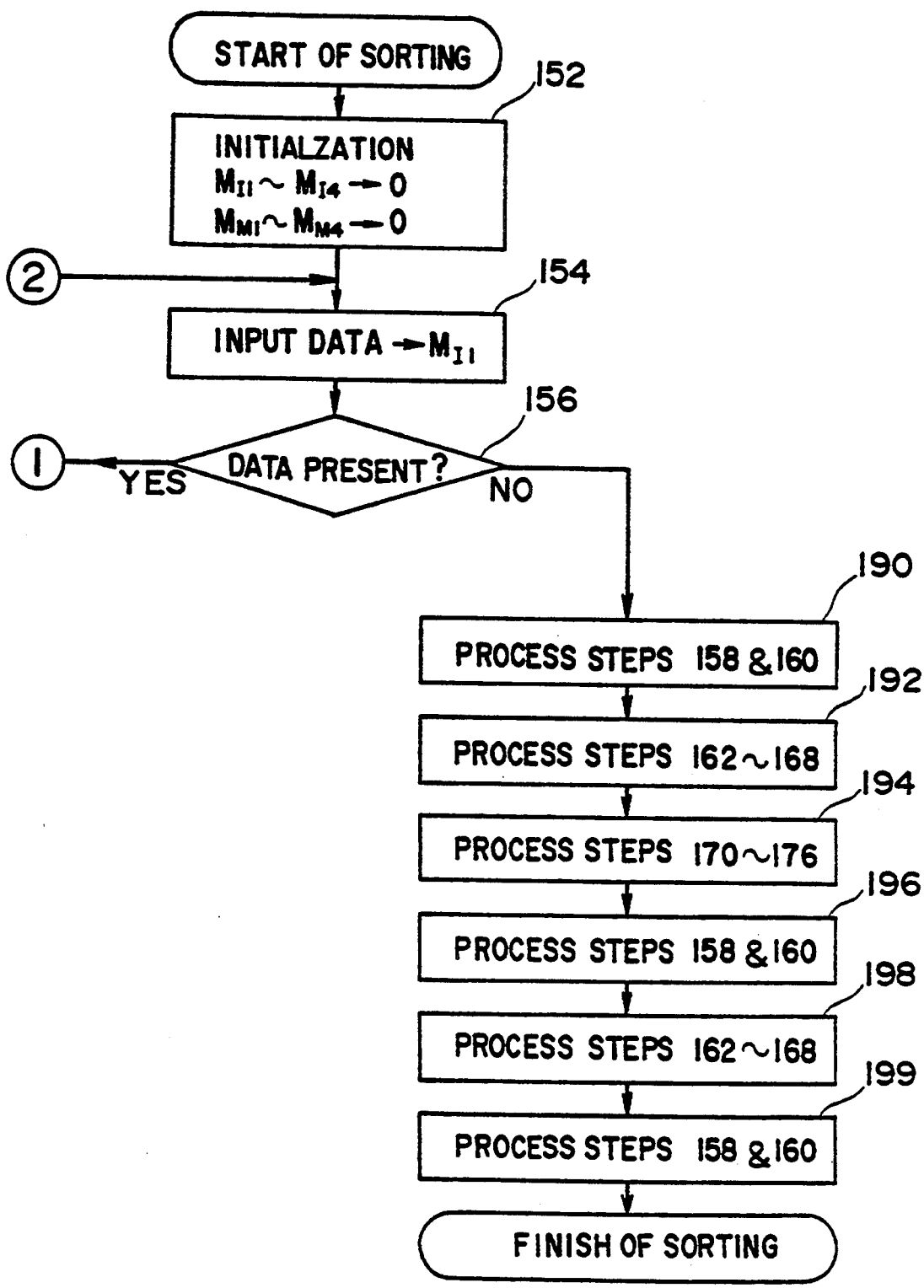
FIGS. 18(a) and (b) are flow charts explaining the sorting processing.
Figure 18B:
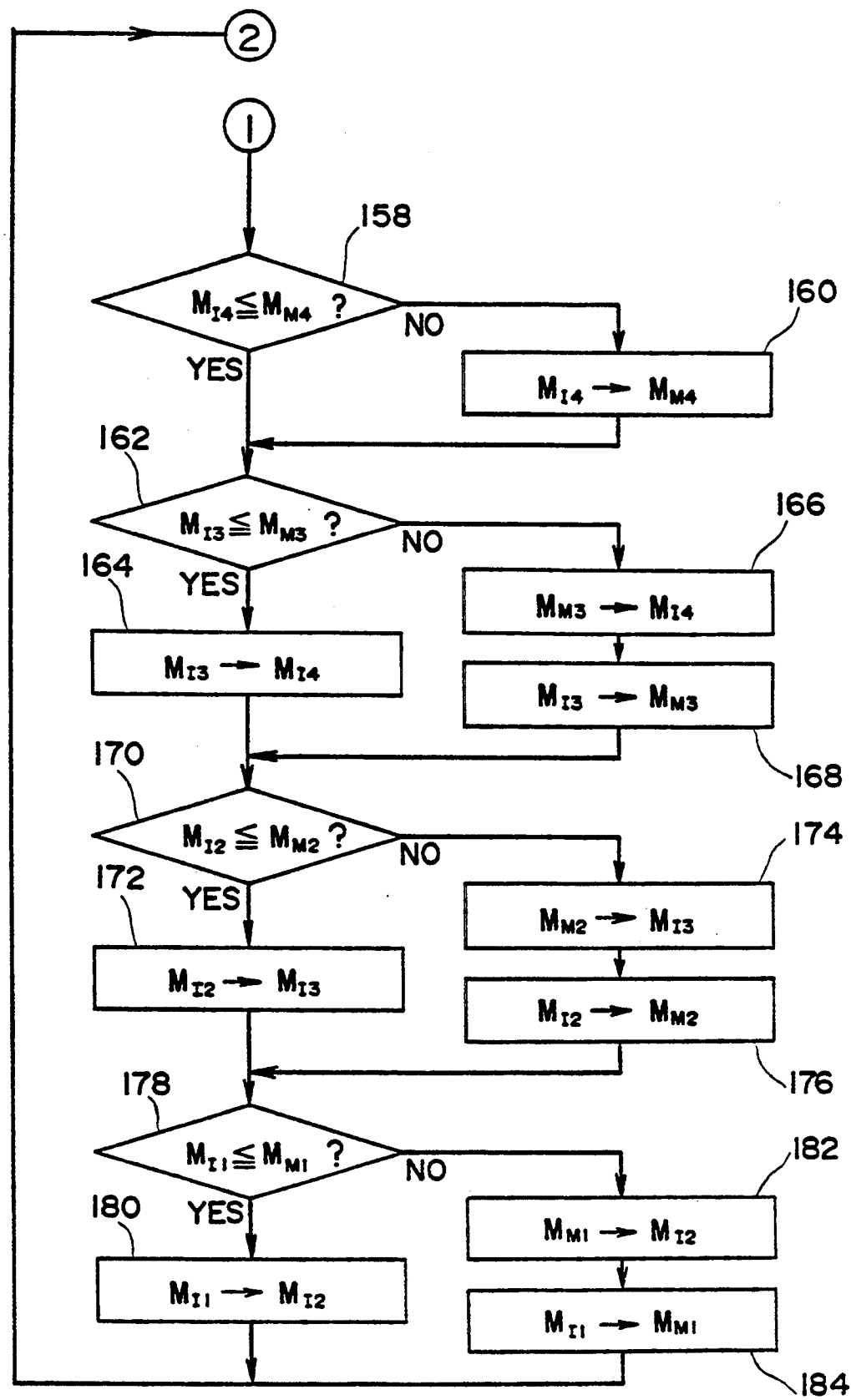

The sorting processing of Step 118 in FIG. 7 will be explained below with reference to the flow chart of FIG. 18.

For the sorting processing, a plurality of input memories (transfer memories) $M_{I1} \sim M_{I4}$ (4 for simplicity), and comparison memories (result memories) $M_{M1} \sim M_{M4}$ (4 for simplicity) are initialized (Step 152). Next, data is inputted to the input memory $M_{I1}$ (Step 154). When it is judged that this input data is present in Step 156, Steps 158~184 will follow, and when judged this input data is absent, Steps 190~199 will follow. Steps 190, 196 and 199 perform the same processing as Steps 158 and 160 respectively. Steps 192 and 198 perform the same processing as Step 162~168 respectively. Step 194 performs the same processing as Steps 170~156.

Steps 158, 162, 170 and 178 respectively compare the magnitudes of the content of the corresponding input memory $M_I$ and that of the comparison memory $M_M$ upon finding $M_I \leq M_M$, the content of the input memory $M_I$ is transferred to the next Steps 164,152 and 180. Contrary to this, when $M_I > M_M$, the content of the comparison memory $M_M$ is transferred to the next input memory $M_I$ (Steps 168, 176, 184). Finally the memories $M_{MI} \sim M_{M4}$ hold 4 input data in the sequential order of the magnitude.

Figures 19A, 19B:
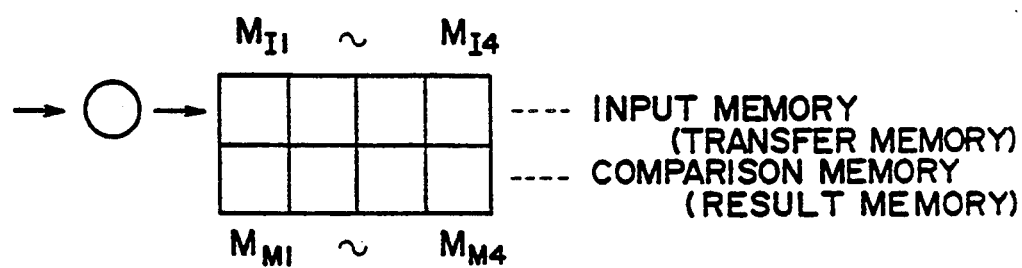
FIGS. 19(a)–(d) are views specifically explaining the sorting processing.
Figure 19C:
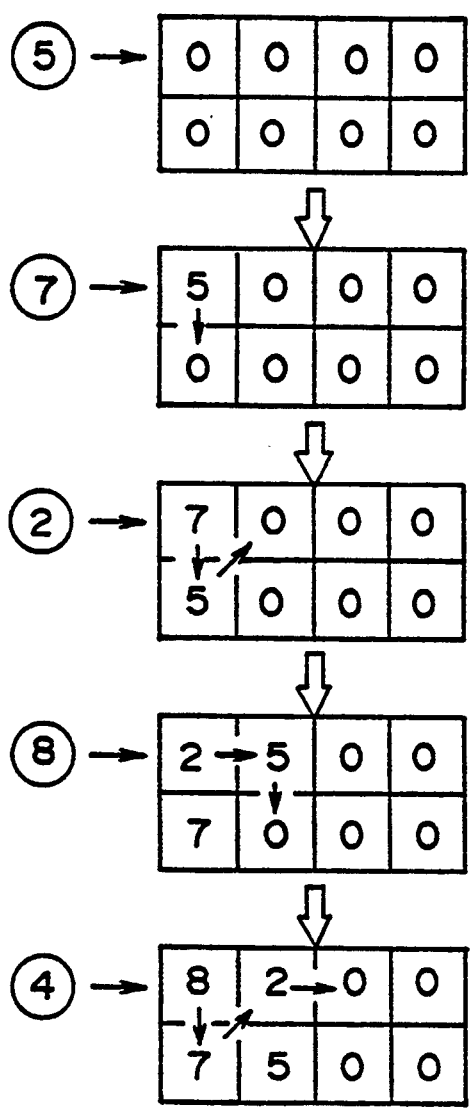
Figure 19C:
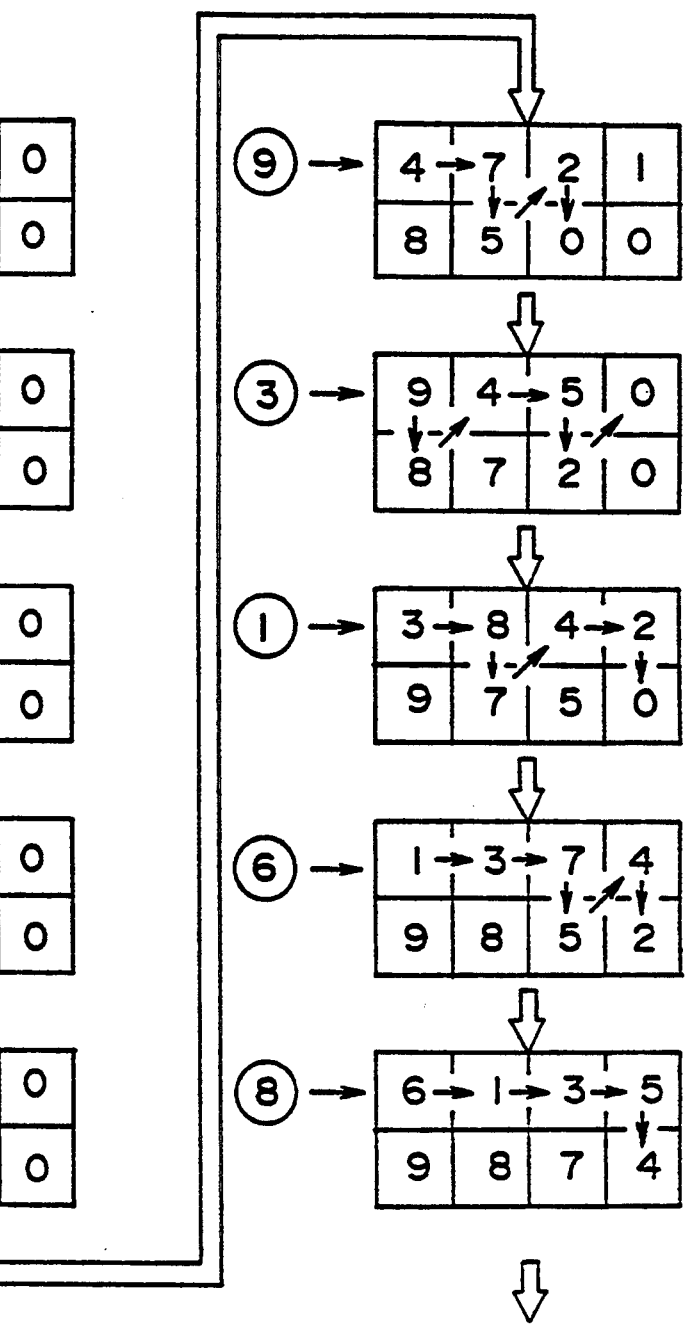
Figure 19D:
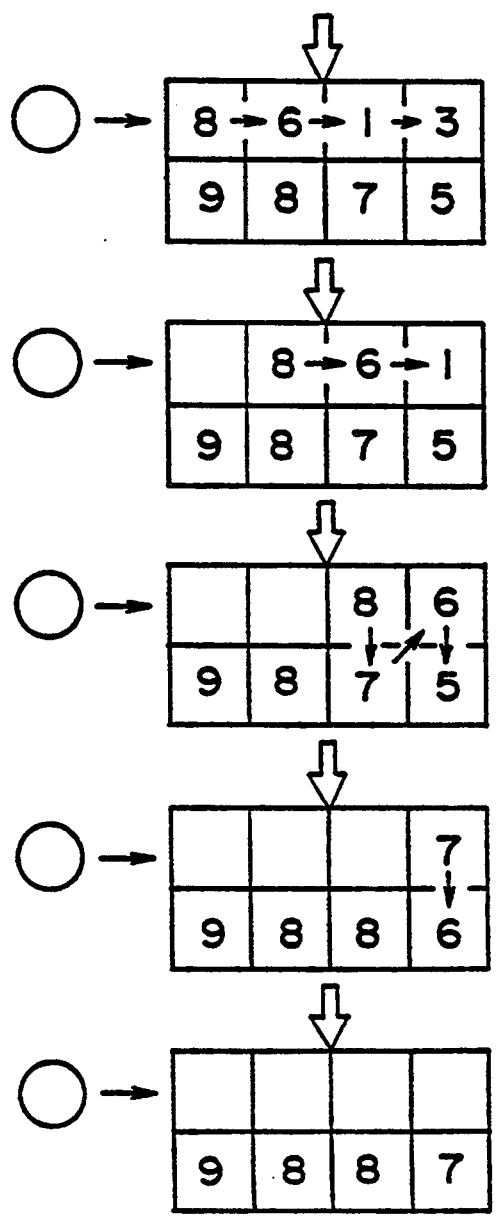
Figure 20A:
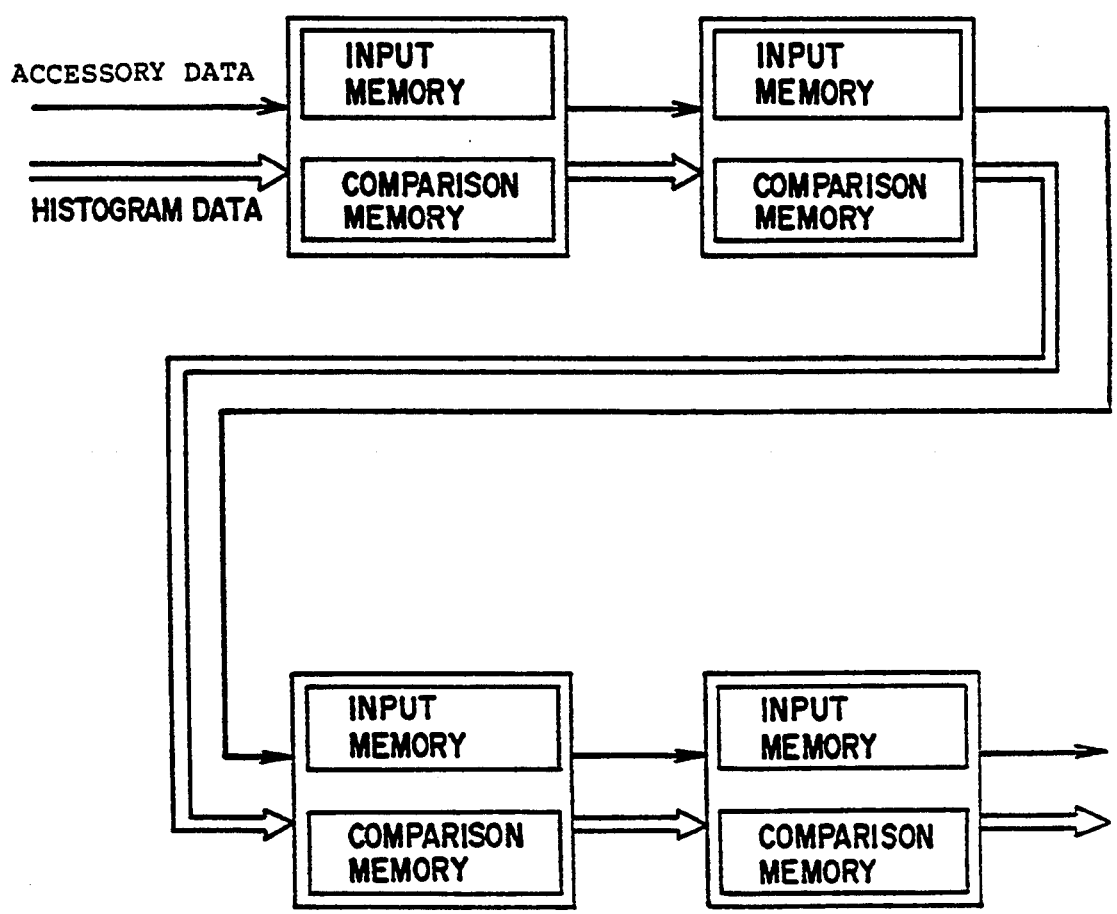
FIGS. 20(a) and (b) are block diagrams of the sorting unit.
Figure 20B:
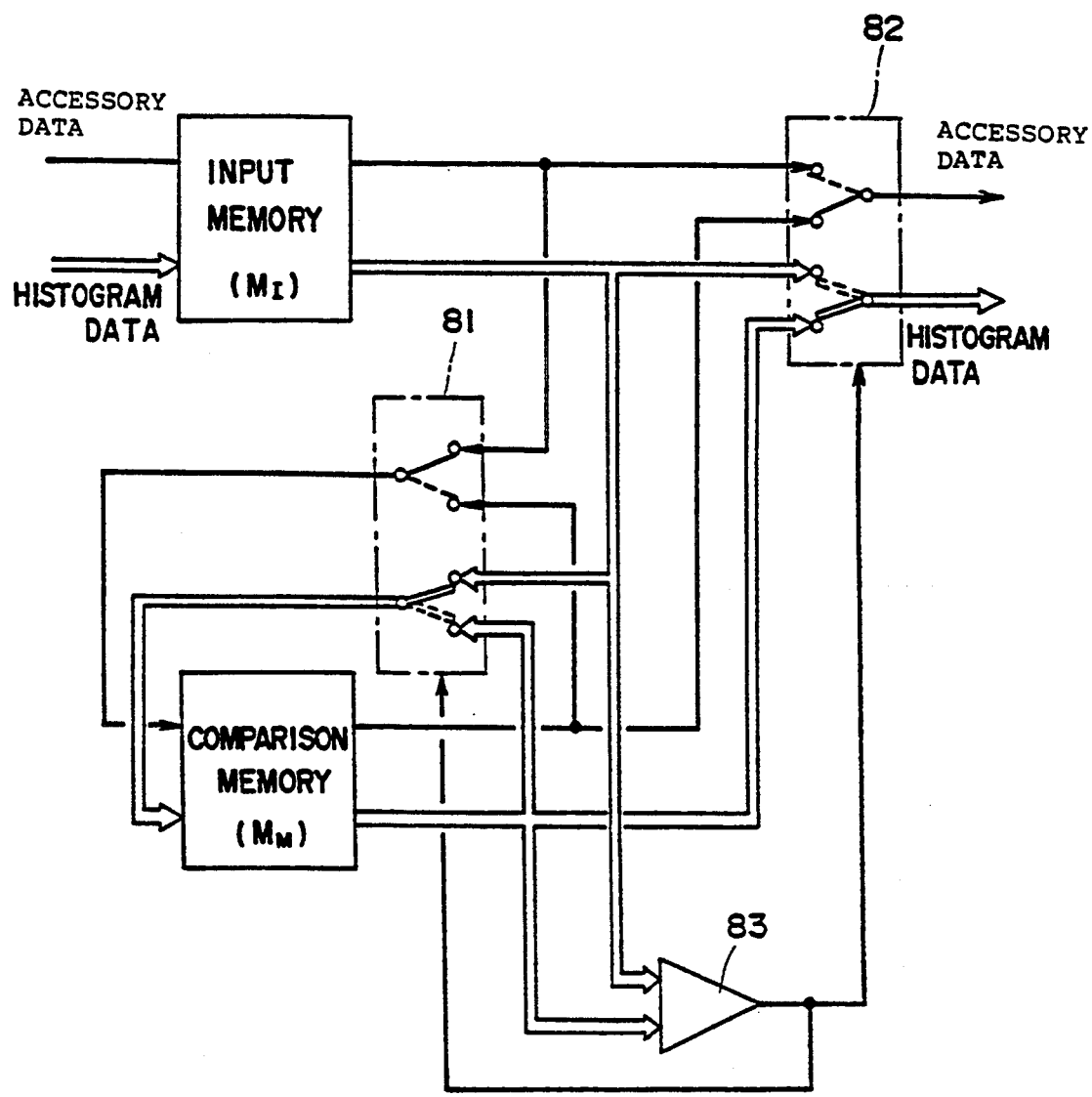

This is shown specifically in FIGS. 19 and 20. Four memories $M_{I1} \sim M_{I4}$ as the input memories, and four memories $M_{M1} \sim M_{M4}$ as the comparison memories are provided. The input memories and comparison memories are mated respectively in four stages of circuits. Each stage of circuits, as shown in FIG. 20, comprises a pair of the input memory $M_I$ and the comparison memory $M_M$, switching circuits 81, 82, and a comparator 83. When data inputted to the input memory $M_1$ is larger than the data stored by the comparison memory $M_M$, the comparator 83 supplies an output which actuates the switching circuit 81 as indicated by a solid line in FIG. 20, and the input data is stored by the comparison memory $M_M$. At the same time, since the switching circuit 82 is in the state as indicated by a solid line, the data stored by the comparison memory $M_M$ is transferred to a next stage. In contrast to this, when input data (to the input memory $M_I$) is smaller than the data stored in the comparison memory $M_M$, the comparator 83 controls the switching circuits 81, 82 to be in the states indicated by dot lines. The input data is transferred directly to a next stage. The content of the comparison memory $M_M$ does not change.

It is assumed that in this sorting unit, the input data are 10, i.e., 5, 7, 2, 8, 4, 9, 3, 1, 6, 8 as shown in FIG. 19(a). Operations following the initialization as in FIG. 19(b) change the data stored in the comparison memories $M_I \sim M_{M4}$ in the sequence indicated by the arrow in FIG. 19 (c), and finally the contents

| Comparison memory | $M_{M1} = 9$ |
|---|---|
| do. | $M_{M2} = 8$ |
| do. | $M_{M3} = 8$ |
| do. | $M_{M4} = 7$ | are stored. This sorting processing may be executed by software. Following a series of the above described processings, the picture processing device according to this invention finishes all the steps of its signal processing. Then an approximate straight line interconnecting the points to be processed on the original picture is given in values of the above described $\rho, \theta$.

Figure 21:
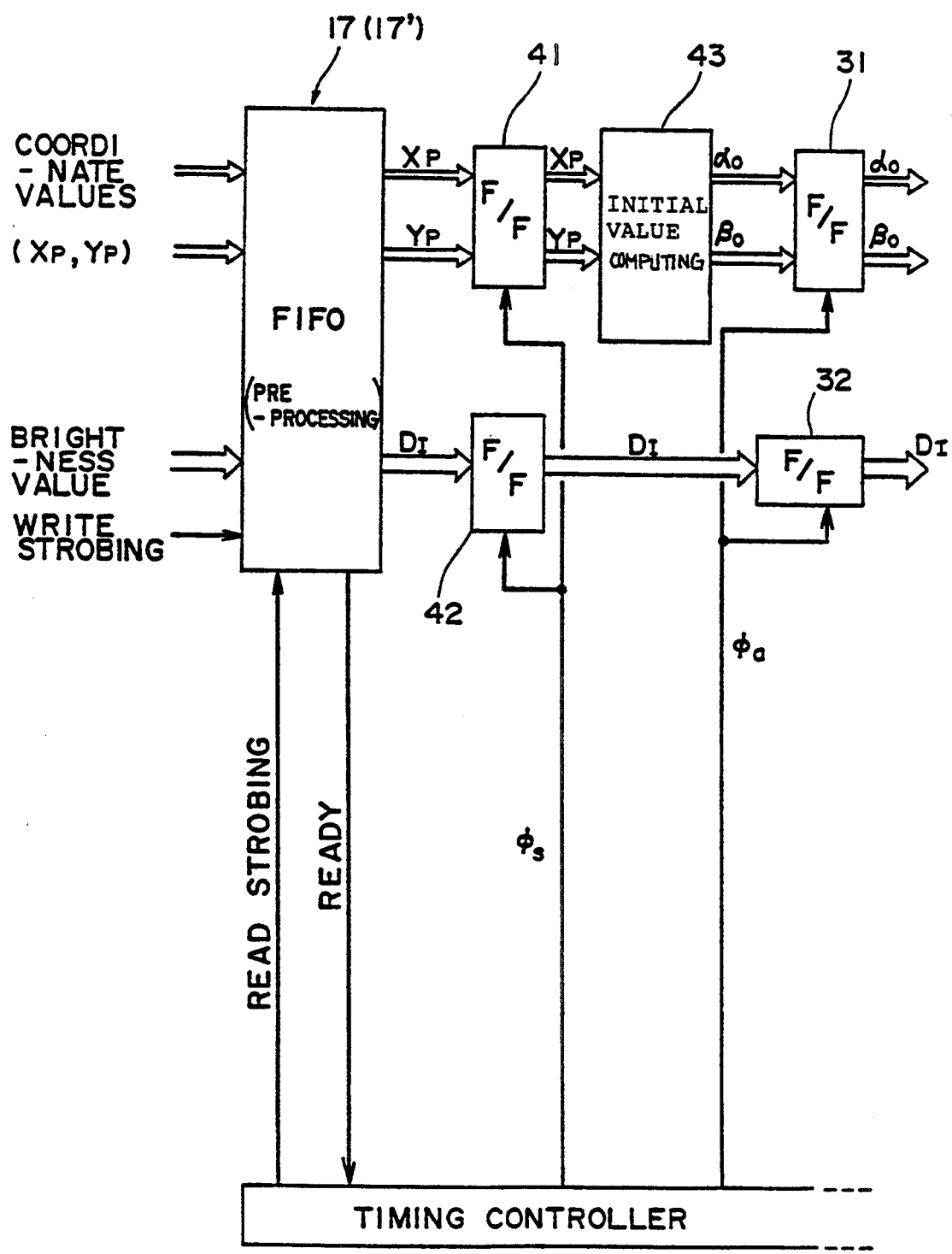
FIG. 21 is a block diagram of a major part of the picture processing device according to another embodiment of this invention.

The picture processing device according to another embodiment of this invention is characterized in that an initial value computing unit is inserted between the pre-processing unit and the DDA computing unit. As shown in FIG. 21 corresponding to FIG. 6, the initial value computing unit comprises two flip flop (F/F) 41, 42, and an initial value computing circuit 43. The F/F 41 temporarily stores coordinate values $(x_p,y_p)$ of the point to be processed in the x-y coordinate system. The F/F 42 temporarily stores brightness value data $D_I$ of the point to be processed P. The initial value computing circuit 43 computes coordinates of an initial value in the $\alpha$-$\beta$ rectangular coordinate system, based on the coordinate values $(x_p,y_p)$ so as to enable the computation of the rotary motion recurrence formula.

Figure 22A:
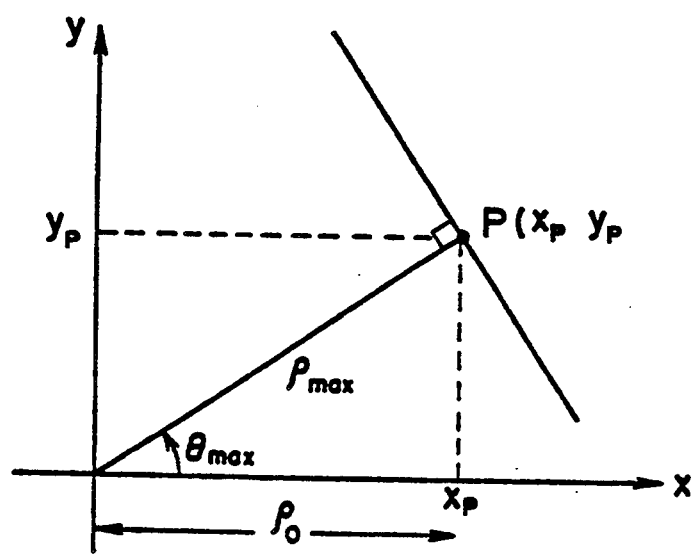
FIGS. 22(a)–(c) are views explaining the Hough transform in this another embodiment.
Figure 22B:
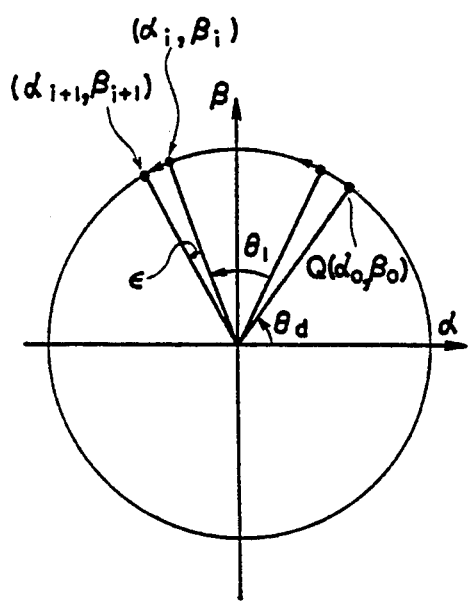
Figure 22C:
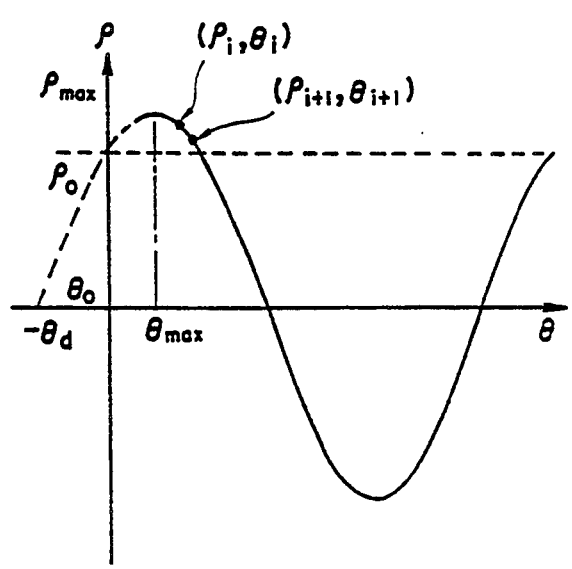

In this embodiment, in computing the rotary motion recurrence formula, firstly the computation of an initial value is executed. The initial value computing unit is supplied with the data pre-processed by the FIFO 17' to give an initial value $(\alpha_0,\beta_0)$ for computing the rotary motion recurrence formula. In FIG. 22 corresponding to FIG. 11, when a rotary motion is started at the point to be processed P $(x_p,y_p)$ at an arbitrary position (angle) $\theta'$ $(=\theta_0)$ (rad), $$\alpha_0 = x_p\sin\theta' + y_p\cos\theta'$$

$$\beta_0 = x_p\cos\theta' + y_p\sin\theta' \qquad (9)$$

The initial value $(\alpha_0,\beta_0)$ is computed by the initial value computing unit 40 to be supplied to the DDA computing unit 18 as an address signal. The initial computing unit 40 stores the values of the the $\sin\theta',\cos\theta'$ beforehand in a ROM (not shown), and referring to these data, computes Formula 9 using adders and multiplier (both not shown). Compared with the computation of the recurrence formula, that of Formula 9 requires more computing time and is more complicated but is performed on only one point to be processed $(x_p,y_p)$. Accordingly, the total computing time is not much increased, nor is the hardware large sized. The initial value computation is made very easy by starting a rotary motion at $\theta=0°$, 90°, 180° and 270° at the point to be processed $P(x_p,y_p)$.

This will be explained below with reference to FIG. 21. The initial value computing unit is supplied with data when a ready signal is supplied from the timing controller 25. Then a read strobing signal is supplied from the timing controller 25 to the FIFO 17' and the coordinates $(x_p,y_p)$ of the point to be processed P are stored in the F/F 41. At this time brightness value data $D_I$ at the point to be processed P is stored by the F/F 42. Then, in synchronization with a timing pulse $\theta_s$ from the timing controller 25, the F/F 41 outputs the coordinates $(x_p,y_p)$, and the initial value computing unit 43 gives the initial value $(\alpha_0,\beta_0)$ by the recurrence formula, based on the coordinate values $(x_p,y_p)$ of the point to be processed P. The following computation of the recurrence formula is the same as in the first embodiment.

This invention is not limited to the above described embodiment and covers various modifications.

To give examples, in Step 124 in FIG. 9 a plurality of windows may be set, and when windows overlap, one of the overlapping windows may have priority of being processed. It is not essential to set a window, and instead the entire original picture may be processed and may be subjected to the Hough transformation. But, in this case, the peripheral region of the original picture indicated by the dot line Q in FIG. 8(a) contains so many noise components that it is necessary to remove this peripheral region beforehand for the picture processing of high precision.

In obtaining histograms at the points of intersection of Hough curves, in place of the brightness value data based on brightness change ratios(value of differentiated edged data), two valued data may be multiplexed so that the histogram is based on density of points of intersection. Instead of preparing the edged data by differentiation, data corresponding to the brightness may be digitally processed as brightness data, and then histograms may be obtained at points of intersection of Hough curves.

It is not essential that the rotary motion recurrence formula be performed along the entire circumference (one round) of an approximate circle, but the computation may be performed along a ½, ¼ or ⅛ circumference. For example, DDAs are arranged serially in a number necessary for the computation along a ¼ circumference for $0 \leq \theta < \pi/2$ and $\pi \leq \theta < 3\pi/2$. The values along the other portion of a circumference $(\pi/2 \leq \theta < \pi, 3\pi/2 \leq \theta < 2\pi)$ can be given immediately by the DDAs. It is not essential either that the rotation angle is always the same. It may be varied partially.

It is possible that Hough transform is performed along a half circumference.

Figure 23:
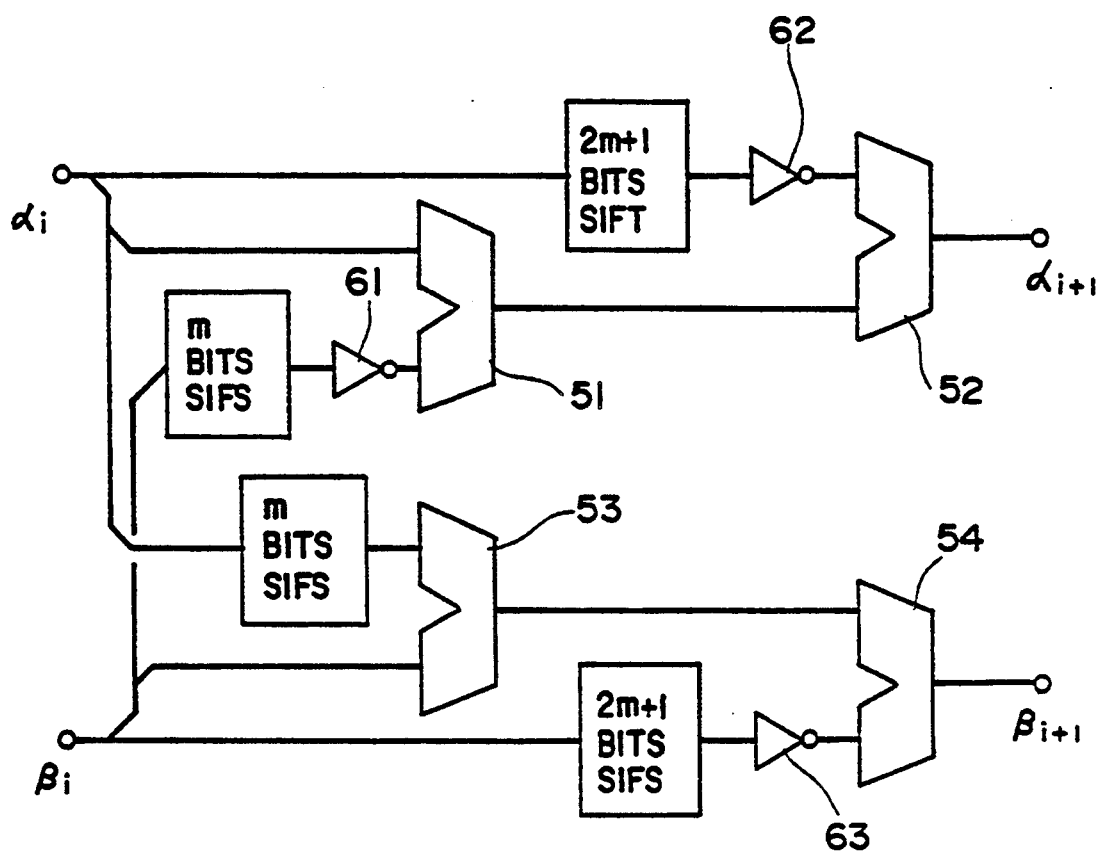
FIGS. 23 and 24 are block diagrams of the computing circuits for the rotary motion recurrence formula.
Figure 24:
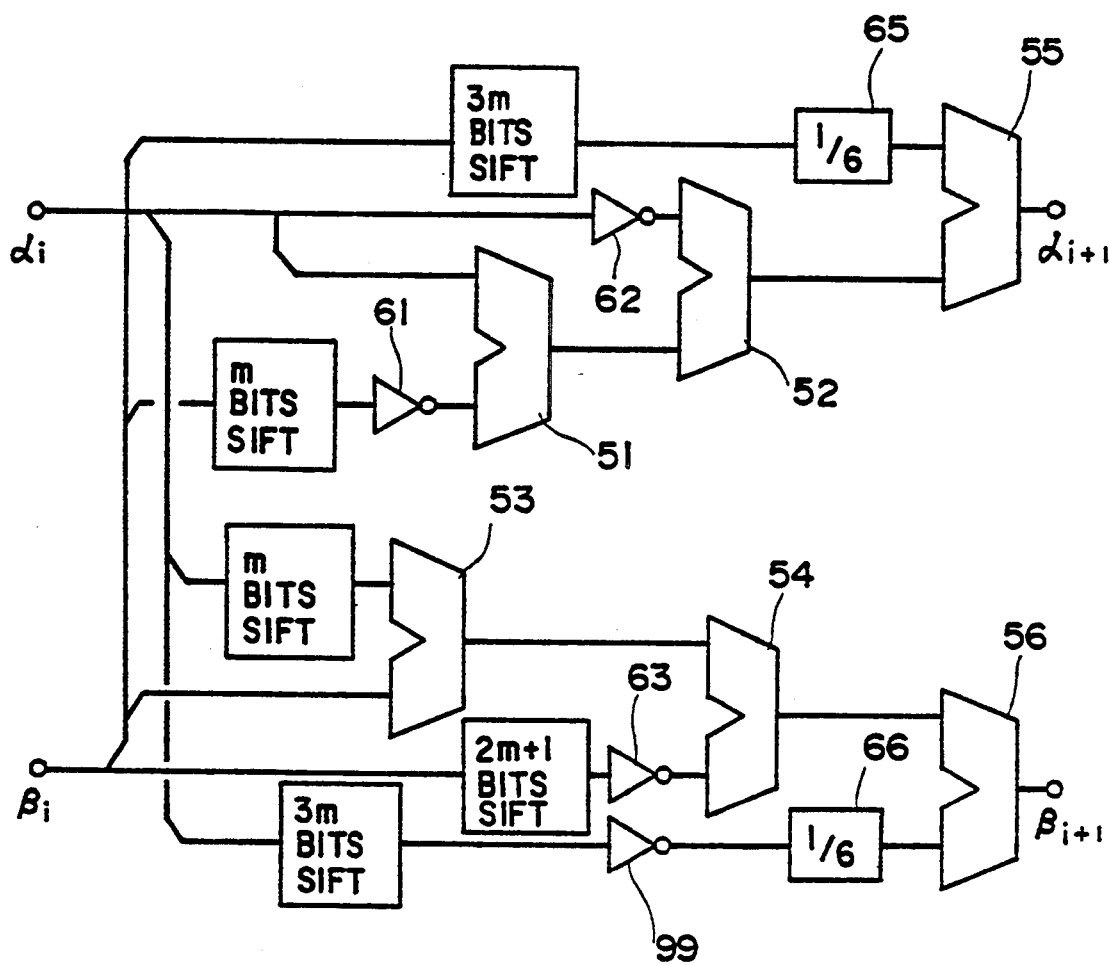

For the computation of the rotary motion recurrence formula, the circuits of FIGS. 23 and 24 may be employed.

In the circuit of FIG. 23, reference numerals 51~54 represent adders; and 61~63, inverters. This circuit can execute the computation of Formula 7. In the circuit of FIG. 24, reference numerals 51~56 represent adders; 65 and 66 indicate 1/6 dividers; and 61~63 and 99, inverters. This circuit can execute the computation of Formula 8.

We claim:

1. A device for detecting a boundary of a roadway upon which a vehicle travels, the device comprising:
    camera means for generating electronic signals representing an image of the roadway, the image comprising a view of the roadway extending in a direction of travel of the vehicle;
    a signal inputting unit for digitizing the signals representing the image of the roadway;
    an edge detecting unit for processing the digitized signals to produce edged picture element signals differentiated with respect to pixel to pixel brightness variations;
    a preprocessing unit for receiving the edged picture element signals from the edge detecting unit and storing in a multivalue memory circuit edged picture data corresponding to the edged picture element signals, the edged picture data corresponding to each edged picture element signal comprising an address in an X-Y coordinate system and an edged brightness value;
    digital differential analysis computing means including a plurality of digital differential analysis computing circuits which are serially connected, each for converting the addresses of the edged picture data from the X-Y coordinate system to an $\alpha$-$\beta$ coordinate system and computing a rotary motion recurrence formula to generate a plurality of approximate HOUGH curves in a $\rho$-$\theta$ coordinate system, the approximate HOUGH curves intersecting at a plurality of points in the $\rho$-$\theta$ coordinate system, and said rotary motion recurrence formula comprising the equation $$\alpha_{i+1}=\alpha_i-2^{-m}\beta_i,$$

and $$\beta_{i+1}=2^{-m}\alpha_{i+1}+\beta_i$$

wherein an angle of rotation comprises $$\epsilon=2^{-m}(\text{rad}) \ (m=0, 1, 2, \ldots );$$

a histogram memory circuit for storing address data corresponding to the intersection points between the generated approximate HOUGH curves; and
    a processor for generating a signal representing the boundary of the roadway based on the stored address data corresponding to the intersection points of the approximate HOUGH curves.

2. The device of claim 1, wherein the digital differential analysis computing means further comprises an initial value computing circuit for computing coordinate $(\alpha_i, \beta_i)$ of an initial value in the $\alpha$-$\beta$ coordinate system, and the digital differential analysis computing circuits perform the rotary motion recurrence formula computation based on the coordinates $(\alpha_i, \beta_i)$ of the initial value.

3. The device of claim 1, wherein the processor comprises a peak filtering circuit for identifying intersection points having relative maximum frequencies of intersection by the approximate Hough curves, and the processor generates the signal indicative of the boundary of the roadway based on the stored address data corresponding to the intersection points having relative maximum frequencies of intersection.

4. A machine implemented process for detecting a boundary of a roadway upon which a vehicle travels, the process comprising the steps of:
    generating electronic signals representing an image of the roadway, the image comprising a view of the roadway in a direction of travel of the vehicle;

digitizing the signals representing the image of the roadway;

generating edged picture element signals from the digitized signals, the edged picture element signals being differentiated with respect to pixel to pixel brightness;

storing in a memory circuit edged picture data corresponding to the edged picture element signals, the edges picture data comprising addresses in an X-Y coordinate system and edged brightness values;

converting the addresses of the stored edged picture data from the X-Y coordinate system to an $\alpha$-$\beta$ coordinate system and computing a rotary motion recurrence formula to generate a plurality of approximate HOUGH curves in a $\rho$-$\theta$ coordinate system, the approximate HOUGH curves intersecting at a plurality of points in the $\rho$-$\theta$ coordinate system, using a digital differential analysis computing means including a plurality of serially connected differential analysis computing circuits, said rotary motion recurrence formula comprising the equations $$\alpha_{i+1}=\alpha_i-2^{-m}\beta_i,$$

and $$\beta_{i+1}=2^{-m}\alpha_{i+1}+\beta_i$$

wherein an angle of rotation comprises $$\epsilon=2^{-m}(\text{rad})\ (m=0, 1, 2, \ldots);$$

storing address data corresponding to the intersection points between the generated approximate HOUGH curves and a histogram memory circuit; and generating a signal representing the boundary of the roadway based on the stored address data corresponding to the intersection points of the approximate HOUGH curves.

5. A machine implemented process for generating a plurality of approximate HOUGH curves in a $\rho$-$\theta$ coordinate system, said process comprising the steps of:

generating pixel data representative of an image, said pixel data comprising addresses in an X-Y coordinate system and pixel brightness values;

storing said pixel data in a memory circuit;

retrieving said pixel data from said memory circuit; and using a digital differential analysis computing means including an initial value computing circuit and a plurality of serially connected digital differential analysis circuits, converting the addresses of the retrieved pixel data from the X-Y coordinate system to an $\alpha$-$\beta$ coordinate system and processing said converted pixel data using a rotary motion recurrence formula to generate a plurality of approximate HOUGH curves in a $\rho$-$\theta$ coordinate system, said rotary motion recurrence formula being defined by the following equations:

$$\alpha_{i+1}=f_\alpha(\alpha_i,\beta_i,\epsilon)$$

$$\beta_{i+1}=f_\beta(\alpha_i,\beta_i,\epsilon).$$

6. The machine implemented process of claim 5, wherein said rotary motion recurrence formula comprises the equations $$\alpha_{i+1}=\alpha_i-2^{-m}\beta_i,$$

and $$\beta_{i+1}=2^{-m}\alpha_{i+1}+\beta_i$$

wherein an angle of rotation comprises $$\epsilon=2^{-m}(\text{rad})\ (m=0, 1, 2, \ldots).$$

7. The machine implemented process of claim 5, wherein said rotary motion recurrence formula comprises the equations $$\alpha_{i+1}=\alpha_i(1-2^{-2m-1})-2^{-\beta_i},$$

and $$\beta_{i+1}=2^{-m}\alpha_i+\beta_i(1-2^{-m-1})$$

wherein an angle of rotation comprises $$\epsilon=2^{-m}(\text{rad})\ (m=0, 1, 2, \ldots).$$

8. The machine implemented process of claim 5, wherein said rotary motion recurrence formula comprises the equations $$\alpha_{i+1}=\alpha_i(1-2-2m-1)+\beta_i(--^m+\epsilon^{-3m}/6);$$

and $$\beta_{i+1}=\alpha_i(2^{-m}+\epsilon^{-3m}6)+\beta_i(1-2^{-2m-1})$$

wherein an angle of rotation comprises $$\epsilon=2^{-m}(\text{rad})\ (m=0, 1, 2, \ldots).$$

9. A device for detecting a boundary of a roadway upon which a vehicle travels, the device comprising:

camera means for generating electronic signals representing an image of the roadway, the image comprising a view of the roadway extending in a direction of travel of the vehicle;

a signal inputting unit for digitizing the signals representing the image of the roadway;

an edge detecting unit for processing the digitized signals to produce edged picture element signals differentiated with respect to pixel to pixel brightness variations;

a preprocessing unit for receiving the edged picture element signals from the edge detecting unit and storing in a multivalue memory circuit edged picture data corresponding to the edged picture element signals, the edged picture data corresponding to each edged picture element signal comprising an address in an X-Y coordinate system and an edged brightness value;

digital differential analysis computing means including a plurality of digital differential analysis computing circuits which are serially connected, each for converting the addresses of the edged picture data from the X-Y coordinate system to an $\alpha$-$\beta$ coordinate system and computing a rotary motion recurrence formula to generate a plurality of approximate HOUGH curves in a $\rho$-$\theta$ coordinate system, the approximate HOUGH curves intersecting at a plurality of points in the $\rho$-$\theta$ coordinate system, and said rotary motion recurrence formula comprising the equation $$\alpha_{i+1} = \alpha_i(1-2^{-2m-1}) - 2^{-m}\beta_i;$$

and $$\beta_{i+1} = 2^{-m}\alpha_i + \beta_i(1-2^{-2m-1})$$

wherein an angle of rotation comprises $\epsilon = 2^{-m}$(rad) (m=0, 1, 2, ... );

a histogram memory circuit for storing address data corresponding to the intersection points between the generated approximate HOUGH curves; and a processor for generating a signal representing the boundary of the roadway based on the stored address data corresponding to the intersection points of the approximate HOUGH curves.

10. A device for detecting a boundary of a roadway upon which a vehicle travels, the device comprising:

camera means for generating electronic signals representing an image of the roadway, the image comprising a view of the roadway extending in a direction of travel of the vehicle;

a signal inputting unit for digitizing the signals representing the image of the roadway;

an edge detecting unit for processing the digitized signals to produced edged picture element signals differentiated with respect to pixel to pixel brightness variations;

a preprocessing unit for receiving the edged picture element signals from the edge detecting unit and storing in a multivalue memory circuit edged picture data corresponding to the edged picture element signals, the edged picture data corresponding to each edged picture element signal comprising an address in an X-Y coordinate system and an edged brightness value;

digital differential analysis computing means including a plurality of digital differential analysis computing circuits which are serially connected, each for converting the addresses of the edged picture data from the X-Y coordinate system to an $\alpha$-$\beta$ coordinate system and computing a rotary motion recurrence formula to generate a plurality of approximate HOUGH curves in a $\rho$-$\theta$ coordinate system, the approximate HOUGH curves intersecting at a plurality of points in the $\rho$-$\theta$ coordinate system, and said rotary motion recurrence formula comprising the equations $$\alpha_{i+1} = \alpha_i(1-2-2m-1) + \beta_i(-2^{-m} + \epsilon^{-m}/6);$$

and $$\beta_{i+1} = \alpha_i(2^{-m} + \epsilon^{-m}/6) + \beta_i(1-2^{-2m-1})$$

wherein an angle of rotation comprises $$\epsilon = 2^{-m}(\text{rad}) \ (m=0, 1, 2, \ldots );$$

a histogram memory circuit for storing address data corresponding to the intersection points between the generated approximate HOUGH curves; and a processor for generating a signal representing the boundary of the roadway based on the stored address data corresponding to the intersection points of the approximate HOUGH curves.

11. A machine implemented process for detecting a boundary of a roadway upon which a vehicle travels, the process comprising the steps of:

generating electronic signals representing an image of the roadway, the image comprising a view of the roadway in a direction of travel of the vehicle;

digitizing the signals representing the image of the roadway;

generating edged picture element signals from the digitized signals, the edged picture element signals being differentiated with respect to pixel to pixel brightness;

storing in a memory circuit edged picture data corresponding to the edged picture element signals, the edges picture data comprising addresses in an X-Y coordinate system and edged brightness values;

converting the addresses of the stored edged picture data from the X-Y coordinate system to an $\alpha$-$\beta$ coordinate system and computing a rotary motion recurrence formula to generate a plurality of approximate HOUGH curves in a $\rho$-$\theta$ coordinate system, the approximate HOUGH curves intersecting at a plurality of points in the $\rho$-$\theta$ coordinate system, using a digital differential analysis computing means including a plurality of serially connected differential analysis computing circuits, said rotary motion recurrence formula comprising the equations $$\alpha_{i+1} = \alpha_i(1-2^{-2m-1}) - 2^{-m}\beta_i;$$

and $$\beta_{i+1} = 2^{-m}\alpha_i + \beta_i(1-2^{-2m-1})$$

wherein an angle of rotation comprises $$\epsilon = 2^{-m}(\text{rad}) \ (m=0, 1, 2, \ldots );$$

storing address data corresponding to the intersection points between the generated approximate HOUGH curves and a histogram memory circuit; and generating a signal representing the boundary of the roadway based on the stored address data corresponding to the intersection points of the approximate HOUGH curves.

12. A machine implemented process for detecting a boundary of a roadway upon which a vehicle travels, the process comprising the steps of:

generating electronic signals representing an image of the roadway, the image comprising a view of the roadway in a direction of travel of the vehicle;

digitizing the signals representing the image of the roadway;

generating edged picture element signals from the digitized signals, the edged picture element signals being differentiated with respect to pixel to pixel brightness;

storing in a memory circuit edged picture data corresponding to the edged picture element signals, the edges picture data comprising addresses in an X-Y coordinate system and edged brightness values;

converting the addresses of the stored edged picture data from the X-Y coordinate system to an $\alpha$-$\beta$ coordinate system and computing a rotary motion recurrence formula to generate a plurality of approximate HOUGH curves in a $\rho$-$\theta$ coordinate system, the approximate HOUGH curves intersecting at a plurality of points in the $\rho$-$\theta$ coordinate system, using a digital differential analysis computing means including a plurality of serially connected differential analysis computing circuits, said rotary motion recurrence formula comprising the equations $$\alpha_{i+1} = \alpha_i(1 - 2 - 2m - 1) + \beta_i(-2^{-m} + \epsilon^{-3m}/6);$$

and $$\beta_{i+1} = \alpha_i(2^{-m} + \epsilon^{-3m}/6) + \beta_i(1 - 2^{-2m-1})$$

wherein an angle of rotation comprises $$\epsilon = 2^{-m}(\text{rad}) \ (m = 0, 1, 2, \ldots);$$

storing address data corresponding to the intersection points between the generated approximate HOUGH curves and a histogram memory circuit; and generating a signal representing the boundary of the roadway based on the stored address data corresponding to the intersection points of the approximate HOUGH curves.

* * * * *

UNITED STATES PATENT AND TRADEMARK OFFICE
CERTIFICATE OF CORRECTION

PATENT NO. : 5,379,353
DATED : January 3, 1995
INVENTOR(S) : Hasegawa et al.

It is certified that error appears in the above-indentified patent and that said Letters Patent is hereby corrected as shown below:

Title page, item [75], correct the second inventor's name, to read -- Yashushi Okada --.

Signed and Sealed this

Seventeenth Day of October, 1995

*Attest:*

BRUCE LEHMAN

*Attesting Officer*          *Commissioner of Patents and Trademarks*